United States Patent [19]

Mitsutake et al.

[11] Patent Number: 5,602,584
[45] Date of Patent: Feb. 11, 1997

[54] APPARATUS FOR PRODUCING A PANORAMIC IMAGE USING A PLURALITY OF OPTICAL SYSTEMS

[75] Inventors: Hideaki Mitsutake, Tokyo; Jun Tokumitsu, Sagamihara; Shigeyuki Suda, Yokohama; Tatsushi Katayama, Tokyo, all of Japan

[73] Assignee: Canon Kabushiki Kaisha, Tokyo, Japan

[21] Appl. No.: 534,744

[22] Filed: Sep. 27, 1995

Related U.S. Application Data

[63] Continuation of Ser. No. 139,425, Oct. 20, 1993, abandoned.

[30] Foreign Application Priority Data

Oct. 22, 1992 [JP] Japan .................................. 4-284343

[51] Int. Cl.$^6$ ..................... H04N 13/02; H04N 15/00; H04N 5/225
[52] U.S. Cl. ..................... 348/47; 348/218; 382/154
[58] Field of Search ..................... 348/25–27, 36–39, 348/42, 43, 46, 47, 48, 50, 139, 207, 218; 382/154

[56] References Cited

U.S. PATENT DOCUMENTS

| | | | |
|---|---|---|---|
| 4,272,756 | 6/1981 | Kakumoto et al. | 382/23 |
| 4,601,053 | 7/1986 | Grumet | 348/139 |
| 4,797,942 | 1/1989 | Burt | 348/218 |
| 4,819,064 | 4/1989 | Diner | 348/47 |
| 4,825,393 | 4/1989 | Nishiya | 348/47 |
| 4,837,616 | 6/1989 | Kasano et al. | 348/42 |
| 5,140,415 | 8/1992 | Choquet | 348/46 |

FOREIGN PATENT DOCUMENTS

| | | | |
|---|---|---|---|
| 5183790 | 7/1993 | Japan | H04N 5/225 |

*Primary Examiner*—Leo Boudreau
*Assistant Examiner*—Bipin Shalwala
*Attorney, Agent, or Firm*—Morgan & Finnegan, L.L.P.

[57] ABSTRACT

It is disclosed that in order to form an image of which the continuity is not lost from the image information of an area in which a double image exists and the vicinity thereof and prevent the deterioration of the image, an image processing portion to which video signals from left and right image taking systems are input has an image input portion, an image conversion portion and a synthesized image memory. The image conversion portion has a corresponding point sampling unit for sampling pairs of corresponding points corresponding to the same portion of an object from the video signals, a double image area-dividing unit for effecting the area division of a double image on the basis of the information of the three-dimensional positions of the sampled pairs of corresponding points, a double image mode-discriminating judging unit for determining an image of greater probability with which each double image is connected to a double image non-generating area, and an either image of two systems and common images of two ones simultaneous-removal unit which uses as synthesized image forming data the image determined to be more probably connected to the double image non-generating area by the double image mode-discriminating judging unit, and removes the other image.

21 Claims, 22 Drawing Sheets

APPARATUS FOR PRODUCING A PANORAMIC IMAGE USING A PLURALITY OF OPTICAL SYSTEMS

This is a continuation of U.S. patent application Ser. No. 08/139,425, filed on Oct. 20, 1993, now abandoned.

BACKGROUND OF THE INVENTION

1. Field of the Invention

This invention relates to an image pickup apparatus using an image pickup element such as a CCD (charge coupled device) or an image pickup tube, and particularly to a double-eye image pickup apparatus using a plurality of image pickup elements and an imaging optical system such as a lens.

2. Related Background Art

In recent years, for the purpose of forming a wide panoramic image or forming a highly minute image, there has been proposed a double-eye image pickup apparatus which has a plurality of image taking systems each comprising an imaging optical system and an image pickup element and picks up the image of a common object to thereby form and output a synthesized image by the use of an image signal input from each of said image pickup elements.

A system for obtaining a panoramic image is such that the plurality of different images of an object area are picked up at a time by a plurality of image taking systems and the same object existing in these images is extracted and the respective images are connected together on the basis of relative position information in the images to thereby obtain a synthesized panoramic image.

On the other hand, a system for obtaining a highly minute image is such that as in the case of a panoramic image, the same object existing in each image is extracted and an interpolating process is carried out on the basis of relative position information in the image to thereby newly obtain a highly minute image. A double-eye image pickup apparatus based on this principle is such that as shown, for example, in FIG. 22 of the accompanying drawings, a left image taking system $1010_L$ and a right image taking system $1010_R$ are prepared and the image of an object 1101 is picked up by the left image taking system $1010_L$ and the right image taking system $1010_R$. A left image $I_L$ obtained by the left image taking system $1010_L$ and a right image $I_R$ obtained by the right image taking system $1010_R$ are then synthesized by sampling a corresponding point by a CPU 1120 to thereby obtain an output image $I_{OUT}$ which is highly minute as compared with a case where the image of an object is picked up by a single image taking system.

SUMMARY OF THE INVENTION

However, the above-described double-eye image pickup apparatuses have suffered from the following problems. In the apparatus for obtaining a panoramic image, a plurality of images are connected together and therefore are not limited within the maximum angle of field of an image taking system and further, a panoramic image is re-formed from a plurality of images picked up at the same timing and therefore, there can be realized a flexible image pickup apparatus of a construction comprising a combination of a plurality of image taking systems enough to be able to cover a desired object area including a moving object, but images are picked up in juxtaposed relationship with one another except for some connected portions thereof and therefore, rather almost all image regions become objects having no corresponding point. In this case, objects corresponding to each other in the connected portion of the images sometimes appear as a so-called double image in which the objects do not coincide with each other on the formed image but exist doubly, and this has led to a problem that the continuity of the image is lost, thus resulting in the deteriorated dignity of the image. Here, the continuity of the image refers to the fact that in a gazed portion, the shape (outline or the like), density (luminance), etc. of an object are connected continuously and smoothly.

Also, in the apparatus for obtaining a highly minute image, highly accurate corresponding point relative position information (one pixel pitch or less) is required and the image interpolating method is also required to be highly accurate. Accordingly, when such accuracy is not sufficiently satisfied, high frequency noise components which originally ought not to exist may be superposed one upon another, thus resulting in rather the deterioration of the image. On the other hand, as regards time resolution, when it is supposed that this double-eye image pickup apparatus is used for television, it is necessary that about 30 frames of images per second be continuously introduced and therefore, the processing of these images must be rapid and is desired to be as simple as possible.

The present invention has been made in view of these problems and a first object thereof is to provide a double-eye image pickup apparatus for forming an image which does not lose continuity from the image formation of an area in which a double image exists and the vicinity of the area, thereby preventing the deterioration of the image.

A second object of the present invention is to provide a double-eye image pickup apparatus which satisfies the real time required by the image pickup apparatus and yet is free of the deterioration of at least the quality of image as compared with an original image before a synthesized image is formed.

To achieve the above objects, the double-eye image pickup apparatus of the present invention has a plurality of imaging optical systems, a plurality of image taking systems each comprising an image pickup element corresponding to each of said imaging optical systems, and an image processing portion for forming and outputting a synthesized image by the use of image signals input from said image pickup elements by image-picking up an object, and is characterized in that pairs of corresponding points corresponding to the same portion of said object are sampled from each of said image signals, and with regard to at least some pairs of corresponding points of said sampled pairs of corresponding points, at least one pair of corresponding points of said some pairs of corresponding points are used as synthesized image forming data and the other pairs of corresponding points are not used as the synthesized image forming data.

Also, said synthesized image may be a panoramic synthesized image comprising said image signals juxtaposed and combined together, and in this case, said image processing portion may be:

one which, with regard to the pairs of corresponding points of said sampled pairs of corresponding points which belong to an image connected to a double image non-generating area image-picked up only by one image taking system, uses are said synthetized image forming data the corresponding point of those pairs of corresponding points which belongs to an image most probably connected to said double image non-generating area;

one which, with regard to the pairs of corresponding points of said sampled pairs of corresponding points which differ in the distance to a double image non-generating area image-picked up only by one image taking system, uses as said synthesized image forming data the corresponding point of those pairs of corresponding points which is nearest to said double image non-generating area; or one which, with regard to the pairs of corresponding points of said sampled pairs of corresponding points which belong to an image connected to one of respective double image non-generating areas image-picked up only by one image taking system, uses the corresponding point in said one image as said synthesized image forming data, and with regard to the corresponding point belonging to images connected to both of said double image non-generating areas, enlarges the corresponding point in one of said two or more images in the direction of juxtaposition of the images and uses it as said synthesized image forming data.

Further, said synthesized image may be a highly minute image provided by synthesizing said image signals, and in this case, said image processing portion may be:

one which, with regard to the pairs of corresponding points of said sampled pairs of corresponding points in which the spacing between the corresponding points is smaller than a predetermined spacing, uses one corresponding point in said pairs of corresponding points as said synthesized image forming data;

one which, with regard to at least some of said pairs of corresponding points which require the correction of distortion before the sampling of the corresponding points, uses one of said some corresponding points as said synthesized image forming data;

one which, with regard to at least some of said sampled pairs of corresponding points in which the degree of blur of image foreseen from the in-focus object plane of each said image taking system and the numerical aperture of each said imaging optical system exceeds a predetermined threshold value, uses one corresponding point of said some pairs of corresponding points as said synthesized image forming data; or one which, with regard to at least some of the pairs of corresponding points which, after said pairs of corresponding points are sampled, appear at a predetermined spatial frequency or higher alternately with a pixel point in which corresponding points forming a pair are not found and an area in which said corresponding points forming said pair are not found, uses one corresponding point of said some pairs of corresponding points as said synthesized image forming data.

Also, the double-eye image pickup apparatus has a plurality of imaging optical systems, a plurality of image taking systems each comprising an image pickup element corresponding to each of said imaging optical systems, and an image processing portion for forming and outputting a synthesized image by the use of image signals input from said image pickup elements by image-picking up an object, and is characterized in that one of said image signals is used as a reference image for the formation of the synthesized image and the other image signal is used as an auxiliary image, pairs of corresponding points corresponding to the same portion of said object are sampled from said image signals, and with regard to some pairs of corresponding points of said sampled pairs of corresponding points, the corresponding point in said reference image is used as synthesized image forming data and the corresponding point in said auxiliary image is not used as synthesized image forming data.

In this case, said synthesized image is a panoramic synthesized image comprising said image signals juxtaposed and combined together, and said image processing portion may be one which, with regard to the pairs of corresponding points of said sampled pairs of corresponding points which belong to an image connected to a double image non-generating area image-picked up only by one image taking system, uses as the reference image the image signal most probably connected to said double image non-generating area.

Further, said image taking system having said image pickup element outputting the image signal which provides said reference image may has the optical axes of its imaging optical system disposed toward said object lying in the front direction of the apparatus, said synthesized image is a highly minute image comprising said image signals combined together, and said image processing portion may be one which, with regard to the pairs of corresponding points of said sampled pairs of corresponding points in which the spacing between the corresponding point in said reference image and the corresponding point in said auxiliary image is smaller than a predetermined spacing, uses the corresponding point in said reference image as said synthesized image forming data and does not use the corresponding point in said auxiliary image as said synthesized image forming data, said synthesized image is a highly minute image comprising said image signals combined together, and said image processing portion may be one which, with regard to at least some of said pairs of corresponding points which require the correction of distortion before the sampling of the corresponding points, uses the corresponding point in said reference image as said synthesized image forming data and does not use the corresponding point in said auxiliary image as said synthesized image forming data, said synthesized image is a highly minute image comprising said image signals combined together, and said image processing portion may be one which, with regard to at least some of said sampled pairs of corresponding points in which the degree of blur of image foreseen from the distance from the in-focus object plane of each said image taking system and the numerical aperture of each said imaging optical system exceeds a predetermined threshold value, uses the corresponding point in said reference image as said synthesized image forming data and does not use the corresponding point in said auxiliary image as said synthesized image forming data, said synthesized image is a highly minute image comprising said image signals combined together, and said image processing portion may be one which, with regard to at least some of said sampled pairs of corresponding points which appear at a predetermined spatial frequency or higher alternately with a pixel point in which corresponding points forming a pair are not found and an area in which said corresponding points forming said pair are not found, uses the corresponding point in said reference image as said synthesized image forming data and does not use the corresponding point in said auxiliary image as said synthesized image forming data.

The double-eye image pickup apparatus of the present invention constructed as described above has an image processing portion which samples pairs of corresponding points corresponding to the same portion of an object from image signals, and with regard to at least some of the sampled pairs of corresponding points, uses at least one corresponding point of said some pairs of corresponding points as synthesized image forming data and does not use the other corresponding point as the synthesized image forming data, whereby the deterioration of the synthesized image is prevented. More particularly, in the formation of a panoramic synthesized image, a double image is sometimes created near the connected portion of two images, but by at least one corresponding point of said pairs of corresponding points being used as the synthesized image forming data and the other corresponding point being not used as the synthesized image forming data, said double image is removed and also, good connection of the image with a double image non-generating area is kept. Also, in the formation of a highly minute image, when the corresponding points of the pairs of corresponding points exist very proximately to each other, at least one corresponding point of the pairs of corresponding points is used as synthesized image forming data and the other corresponding point is not used as synthesized image forming data, whereby any unnecessary high frequency component created in sensitive reaction to the error of the relative pixel position of the pairs of corresponding points or a noise component superposed on a pixel value is suppressed. Further, in the formation of a highly minute image, the processing in a distorted image portion, a blurred image portion and an occlusion image portion in which pairs of corresponding points are not found is changed as described above, whereby the omission of any unnecessary processing procedure and the suppression of the deterioration of image by a wrong countermeasure are accomplished.

Also, by setting a reference image for the formation of a synthesized image, an image having at least a predetermined level of image quality is always output. Particularly, an image taking system having an image pickup element outputting an image signal which provides a reference image has the optical axis of its imaging optical system disposed toward said object, whereby an image from at least the front of the object can always be output without being subjected to any special processing, and even during close-up photographing, the photographer can effect photographing without receiving any unnatural feeling of operation.

DETAILED DESCRIPTION OF THE PREFERRED EMBODIMENTS

Some embodiments of the present invention will hereinafter be described with reference to the drawings.

Figure 1:
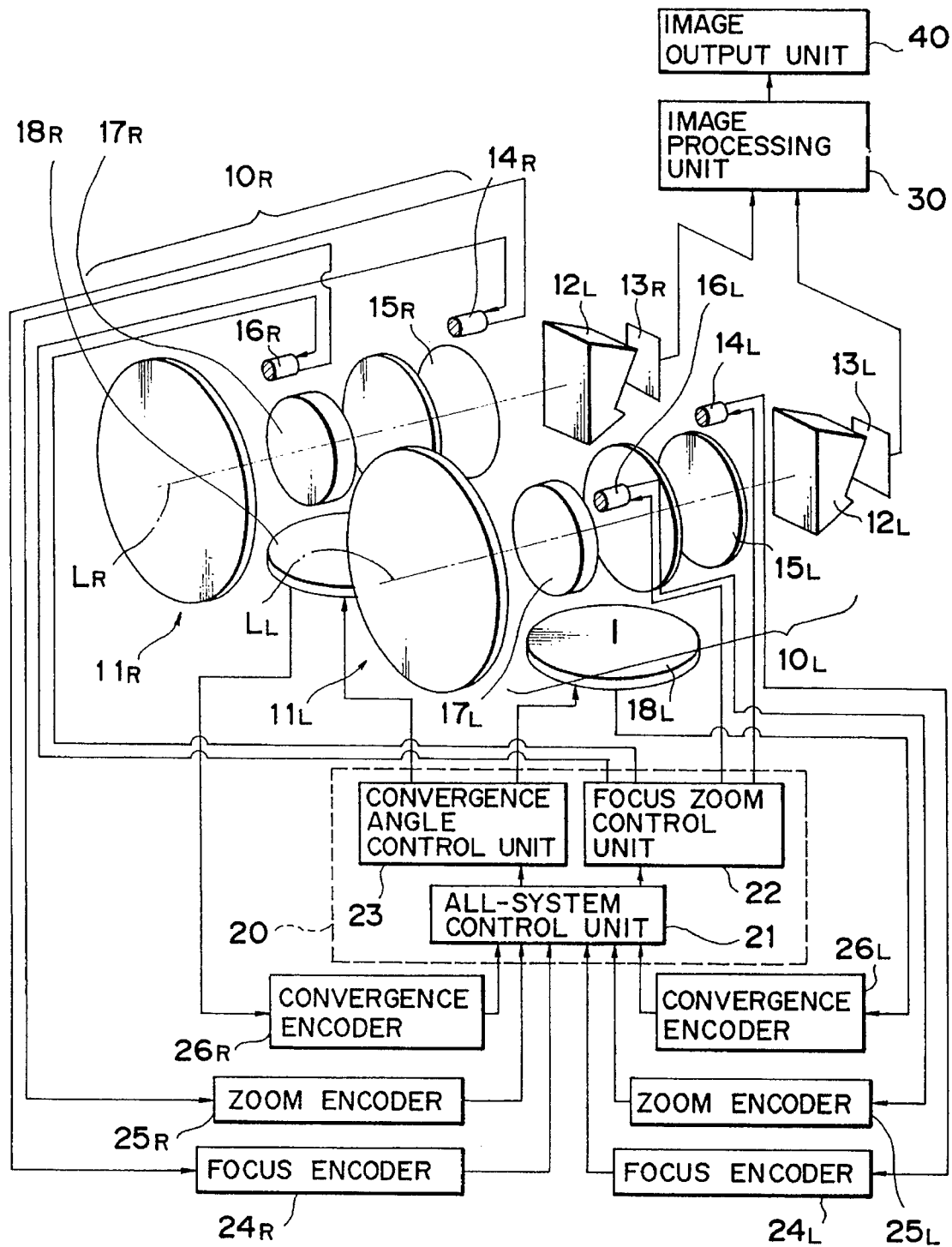
FIG. 1 schematically shows the construction of a first embodiment of the double-eye image pickup apparatus of the present invention.

FIG. 1 schematically shows the construction of a first embodiment of the double-eye image pickup apparatus of the present invention. The double-eye image pickup apparatus of the present embodiment obtains a panoramic synthesized image by parallel-connecting two images obtained by picking up the image of an object by two image taking systems, i.e., a right image taking system $10_R$ and a left image taking system $10_L$.

The left image taking system $10_L$ will first be described. The left image taking system $10_L$ has an image pickup lens unit $11_L$ as an imaging optical system incorporated in a lens barrel, not shown, a color resolving prism $12_L$ for resolving light from an object into three primary colors mounted on the image pickup lens unit $11_L$, and three CCD sensors $13_L$ (only one of which is shown) each having a rectangular effective light receiving portion as an image pickup element provided for each of the lights resolved by the color resolving prism $12_L$. The image pickup lens unit $11_L$ is comprised of a plurality of lenses including a focusing lens unit $15_L$ driven by a focus motor $14_L$ and a magnification changing lens $17_L$ driven by a zoom motor $16_L$, and the motors $14_L$ and $16_L$ are driven in conformity with control signals from an all-system control unit 21 and a focus zoom control unit 22, respectively, in a control unit 20 for controlling the optical system. On the other hand, the right image taking system $10_R$ is also constructed similarly to the left image taking system $10_L$, and the optical axis $L_R$ of the image pickup lens and $11_R$ of the right image taking system $10_R$ is on the same plane as the optical axis $L_L$ of the image pickup lens unit $11_L$ of the left image taking system $10_L$.

Also, the lens barrels in which the image pickup lens-units $11_L$ and $11_R$ are incorporated are coupled to the rotary shafts of convergence angle motors $18_L$ and $18_R$, respectively, driven in conformity with a control signal from the convergence angle control unit 23 of the control unit 20. The rotary shafts of the convergence angle motors $18_L$ and $18_R$ extend in a direction perpendicular to a plane containing the optical axes $L_L$ and $L_R$ of the image pickup lens units $11_L$ and $11_R$, respectively, and by the convergence angle motors $18_L$ and $18_R$ being driven, the image pickup lens units $11_L$ and $11_R$ are rotated with the color resolving prisms $12_L$, $12_R$ and the CCD sensors $13_L$, $13_R$, and the angle formed by the optical axes $L_L$ and $L_R$ of the image pickup lens units $11_L$ and $11_R$ (the convergence angle) is set. In the respective image taking systems $10_L$ and $10_R$, there are provided focus encoders $24_L$ and $24_R$ for detecting the positions of the focusing lens units $15_L$ and $15_R$, respectively, zoom encoders $25_L$ and $25_R$ for detecting the positions of the magnification changing lens units $17_L$ and $17_R$, respectively, and convergence angle encoders $26_L$ and $26_R$ for detecting the convergence angle. As these, use may be made, for example, of exterior type members like potentiometers, or members which detect the positions or angles thereof by the signal information of a driving system itself such as a pulse motor.

Figure 2:
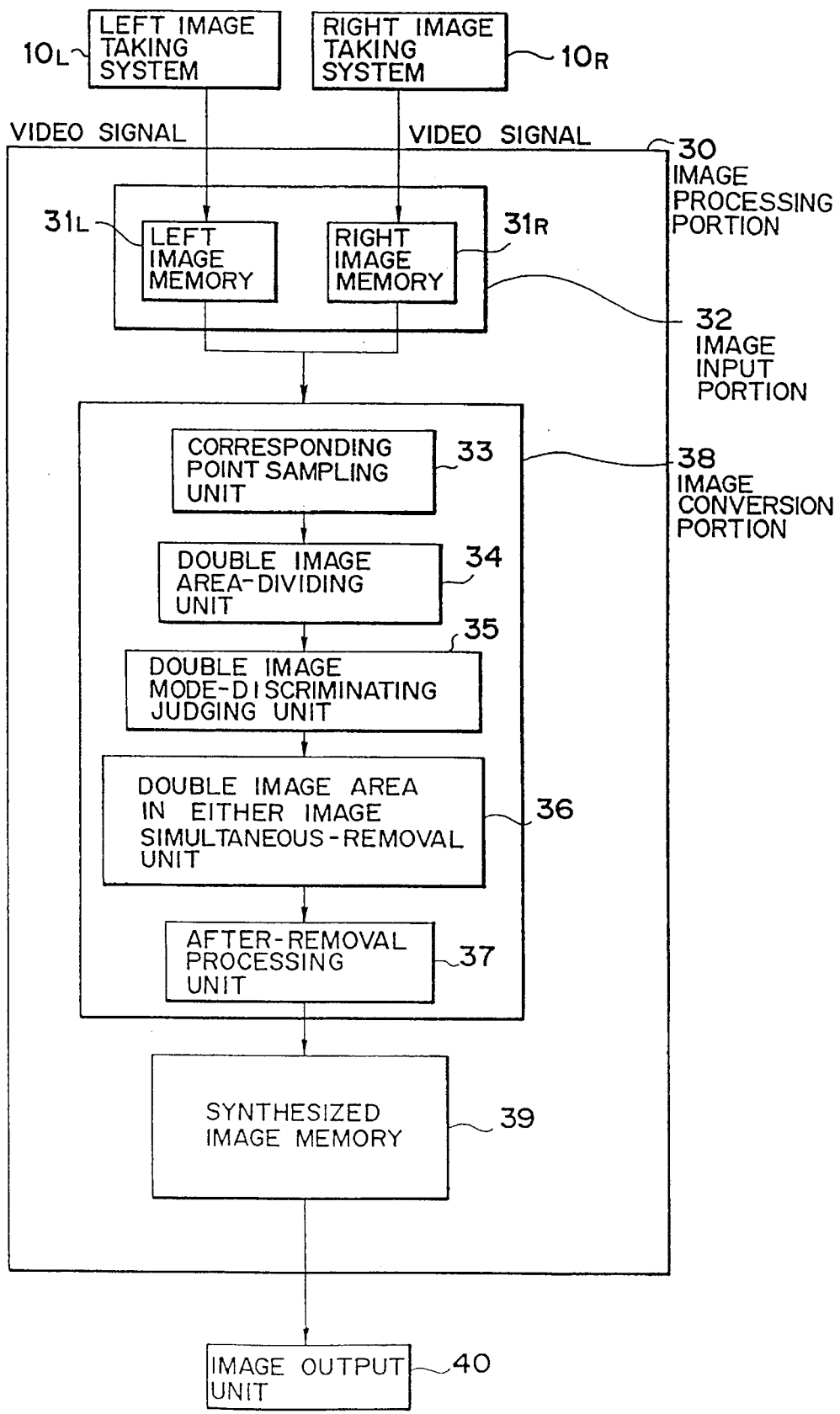
FIG. 2 is a block diagram of an image processing unit shown in FIG. 1.

On the other hand, an image output unit 40 is connected to the CCD sensors $13_L$ and $13_R$ through an image processing unit 30 which is a feature of the present invention. The image processing unit 30, as shown in FIG. 2, has an image input portion 32 comprising a left image memory $31_L$ and a right image memory $31_R$ for holding video signals which are image signals from the CCD sensors $13_L$ and $13_R$ (see FIG. 1) of the image taking systems $10_L$ and $10_R$, an image conversion portion 38 for forming a synthesized image on the basis of left and right images obtained from the video signals input to the image input portion 32, and a synthesized image memory 39 for holding the image synthesized by the image conversion portion 38 and outputting it to an image output unit 40. The image conversion portion 38 is divided into a corresponding point sampling unit 33 for sampling the pairs of corresponding points between the two images input to the image input portion 32 with regard to all pixels of a double image generating area which will be described later, a double image area-dividing unit 34 for calculating the three-dimensional position (distance information) of each pair of corresponding points from the result of the sampling of the pairs of corresponding points, and effecting the area division of the double image by that information, a double image mode-discriminating judging unit 35 for determining the image of the double images divided into areas which is more probably connected to a double image non-generating area, double image area in either image simultaneous-removal unit 36 for leaving a double image belonging to the image side which is more probably connected to said double image non-generating area and using it as synthesized image forming data, and removing a double image belonging to the other image side, and an after-removal processing unit 37 for applying post-processing to the image after the double image is removed.

Figure 3:
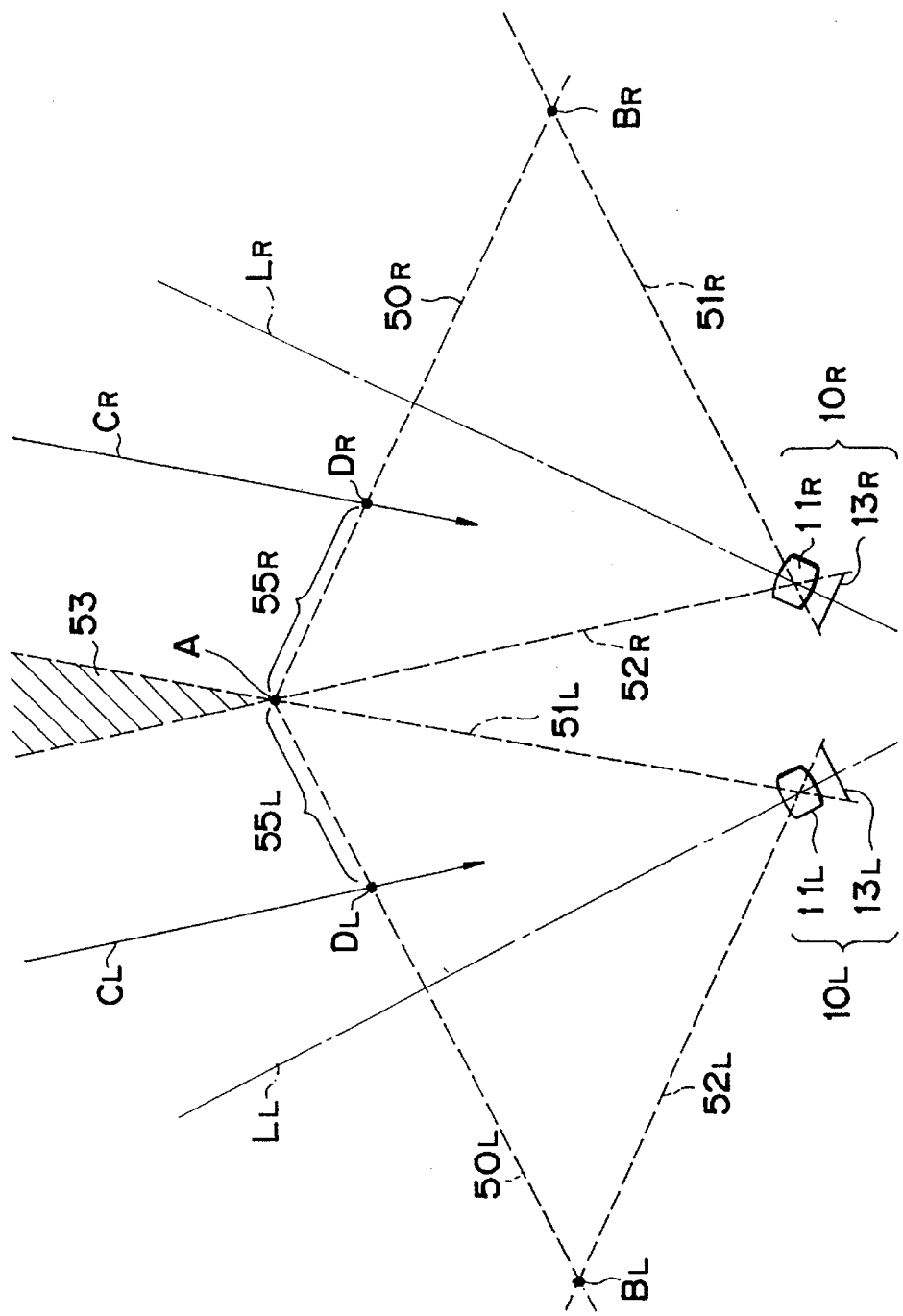
FIG. 3 is a view of the essential portions of the optical system of the double-eye image pickup apparatus shown in FIG. 1 as they are seen in a direction perpendicular to a plane formed by the optical axes of image pickup lens units.

FIG. 3 is a view of the essential portions of the optical system of the double-eye images pickup apparatus shown in FIG. 1 as they are seen in a direction perpendicular to a plane formed by the optical axes $L_L$ and $L_R$ of the image pickup lens units $11_L$ and $11_R$, respectively. However, to simplify the illustration, the color resolving prisms $12_L$ and $12_R$ (see FIG. 1) are omitted and each one of the left and right CCD sensors $13_L$ and $13_R$ is only shown. As shown in FIG. 3, the image pickup lens unit $11_R$ and CCD sensor $13_R$ of the right image taking system $10_R$ have an in-focus object plane $50_R$, and the area which can be image-picked up is limited to the area defined between straight lines $51_R$ and $52_R$, by the effective light receiving portion of the CCD sensor $13_R$, and the area from a line of intersection $B_R$ between the in-focus object plane $50_R$ and end surfaces $51_R$ and $52_R$ to a line of intersection A provides an effective object area. Likewise, with regard to the left image taking system $10_L$, the area from a line of intersection A on an in-focus object plane $50_L$ to a line of intersection $B_L$ provides an effective object area. The focus motors $14_L$, $14_R$ (see FIG. 1) and zoom motors $16_L$, $16_R$ (see FIG. 1) of the left and right image taking systems $10_L$, $10_R$ are controlled so that the distances between the in-focus object planes $50_L$, $50_R$ and the CCD sensors $13_L$, $13_R$ and the imaging magnifications may be equal between the left and the right, and the convergence angle motors $18_L$, $18_R$ (see FIG. 1) are controlled so that the end portions of the effective object areas of the image taking systems $10_L$, $10_R$ may coincide with each other on the line of intersection A. The control of the motors $14_L$, $14_R$, $16_L$, $16_R$, $18_L$ and $18_R$ is effected through the control unit 20 (see FIG. 1) which has received the signals from the encoders $24_L$, $24_R$, $25_L$, $25_R$, $26_L$ and $26_R$ (see FIG. 1). Particularly, the convergence angle motors $18_L$ and $18_R$ are controlled in response to the signals of the positions of the in-focus object planes $50_L$, $50_R$ and the position of the end portion of the effective object area which are calculated from the output signals from the focus encoders $24_L$, $24_R$ and zoom encoders $25_L$, $25_R$.

In the system constructed as described above, one of objects image-picked up by the image taking systems $10_L$ and $10_R$ which has the possibility of being included in both images is an object existing in an area 53 indicated by hatching (an area having a boundary sandwiched between end surfaces $51_L$ and $52_R$ and farther than the line of intersection A). Here, when with it being taken into account that the area 53 having the possibility of being included in these both images expands to infinity relative to the image taking systems $10_L$ and $10_R$, the area 53 is projected onto the in-focus object planes $50_L$ and $50_R$ toward the centers of the object side principal planes of the image pickup lens units $11_L$ and I $11_R$, the area 53, with regard to the right image taking system $10_R$, corresponds to the area $55_R$ between the line of intersection $D_R$ between an arrow $C_R$ indicating a plane passing through the center of the object side principal plane of the image pickup lens unit $11_R$ and parallel to the end surface $51_L$ and the in-focus object plane $50_R$ and the line of intersection A. Likewise, with regard to the left image taking system $10_L$, the area 53 corresponds to the area $55_L$ between the line of intersection $D_L$ between an arrow $C_L$ indicating a plane passing through the center of the object side principal plane of the image pickup lens unit $11_L$ and parallel to the end surface $52_R$ and the line of intersection A. From these facts, what is image-picked up apparently as objects on the areas $55_L$ and $55_R$ may become a double image, and these areas-$55_L$ and $55_R$ become a double image generating area. The other area is an area which is image-picked up only by one image taking system and therefore, becomes a double image non-generating area in which no double image is not generated.

The image processing procedure in the double-eye image pickup apparatus of the present embodiment will now be described with reference to FIG. 2.

Figure 4A:
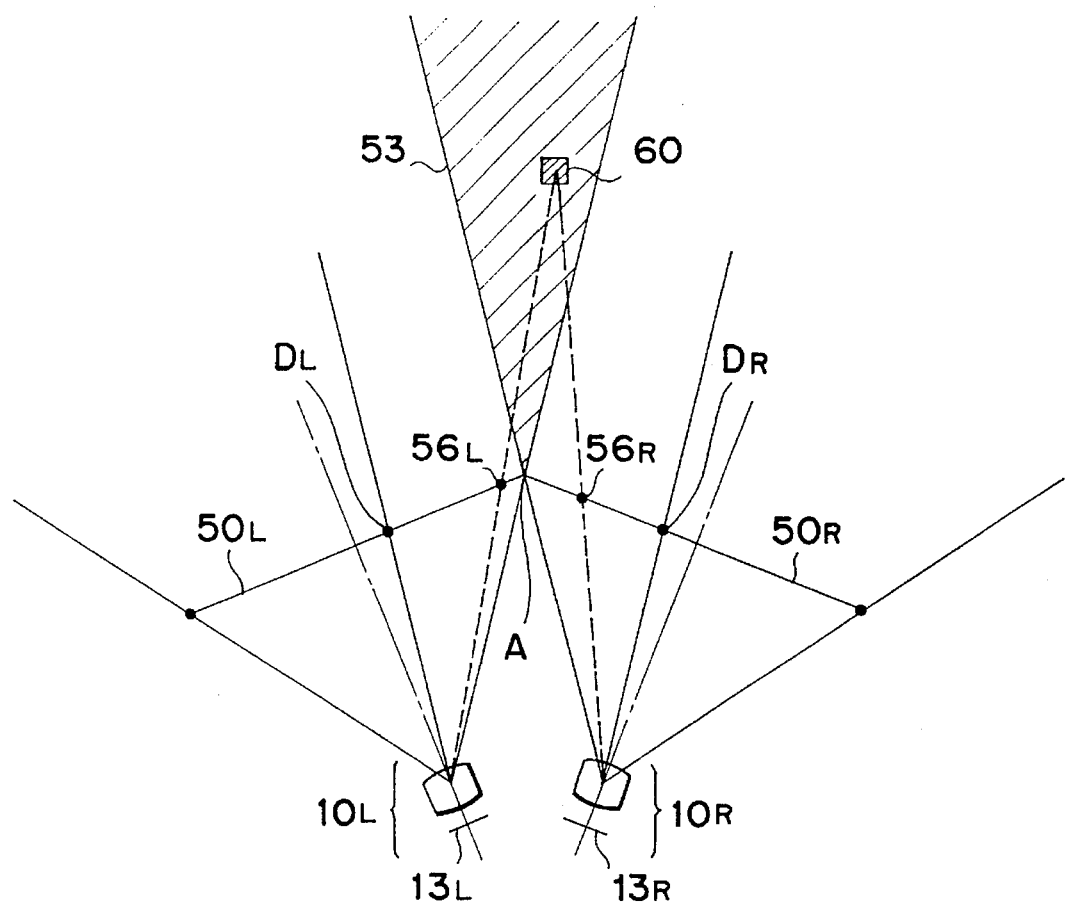
FIGS. 4A and 4B are for illustrating the positional relation of an object when the image of the object is picked up by the double-eye image pickup apparatus shown in FIG. 1, FIG. 4A showing the position of the object when the object is seen in a direction similar to that in FIG. 3, and FIG. 4B being a view of the effective light receiving portions of right and left CCD sensors as they are seen from the image pickup lens unit side.
Figure 4B:
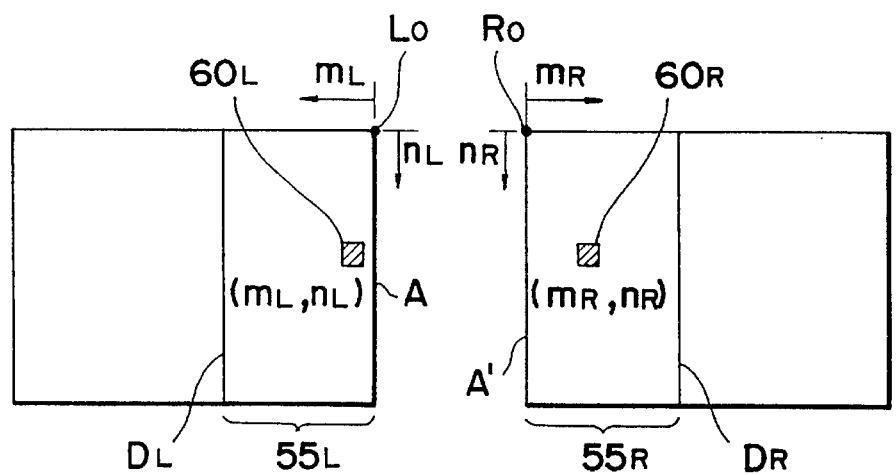

When an object is image-picked up by the left and right image taking systems $10_L$ and $10_R$, image information is input as a video signal for each of the image taking systems $10_L$ and $10_R$ to the image input portion 32 of the image processing portion 30, and is held in the respective image memories $31_L$ and $31_R$. They are FIGS. 4A and 4B that show an example of the positional relation between each image taking system $10_L$, $10_R$ and the object at this time, FIG. 4A showing the position of the object when the object is seen in a direction similar to that in FIG. 3, and FIG. 4B is a view of the effective light receiving portions of the left and right CCD sensors when the object lying at the position shown in FIG. 4A is image-picked up as they are seen from the image pickup lens units side. As shown in FIG. 4A, an object 60 existing in the area 53 having the possibility of being included in the both images is projected onto the CCD sensors $13_L$ and $13_R$ so as to apparently exist in areas $56_L$ and $56_R$ on the in-focus object planes $50_L$ and $50_R$ of the left and right image taking systems $10_L$ and $10_R$. That is, as shown in FIG. 4B, on the right CCD sensor $13_R$, an image $60_R$ corresponding to the object 60 is projected into the area $55_R$ between the line of intersection $D_R$ and the line of intersection A, and on the left CCD sensor $13_L$, an image $60_L$ corresponding to the object 60 is projected into the area $55_L$ between the line of intersection $D_L$ and the line of intersection A. It is to be understood here that the left and right CCD sensors $13_L$ and $13_R$ count the pixel positions in horizontal and vertical directions with points $L_O$ and $R_O$ as origins, respectively, and the positions of the images $60_L$ and $60_R$ in the respective images are indicated by the coordinates ($m_L$, $n_L$) and ($m_R$, $n_R$) of representative points such as the centroids thereof.

Figure 5:
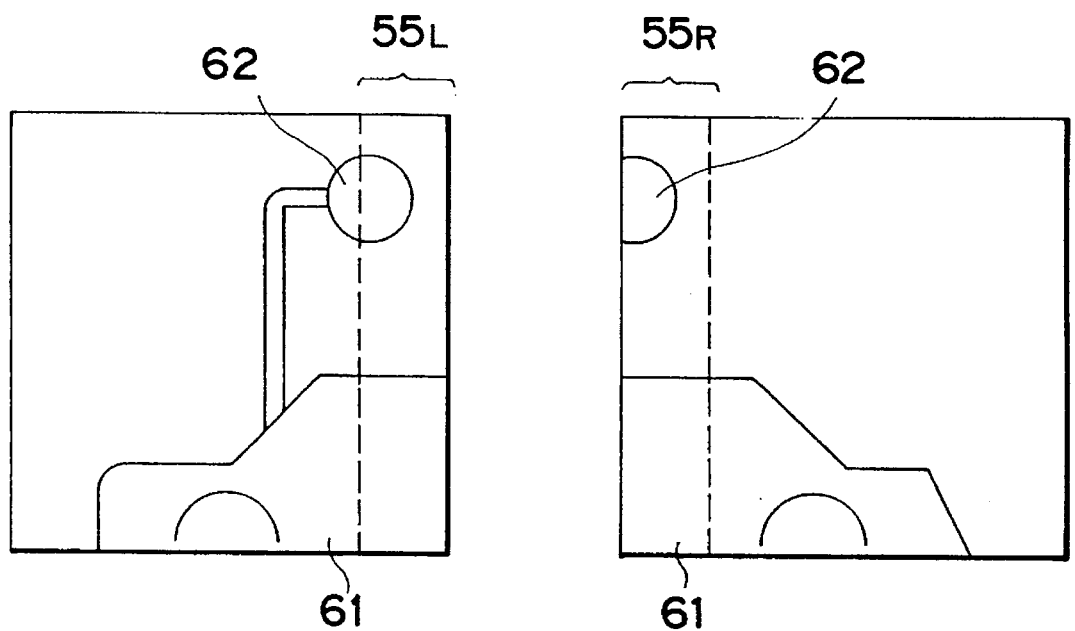
FIG. 5 shows left and right images when a composition in which a road sign is seen on the background of an automobile is image-picked up by the double-eye image pickup apparatus shown in FIG. 1.

This will be specifically described with a case where a composition in which a road sign is seen on the background of an automobile is image-picked up taken as an example. FIG. 5 shows left and right projected images when a composition in which a road sign is seen on the background of an automobile has been image-picked up. The automobile 61 is located substantially on the in-focus object planes $50_L$ and $50_R$ (see FIGS. 3, 4A and 4B) of the two image taking systems, respectively. In FIG. 5, areas $55_L$ and $55_R$ are double image generating areas as described above, and the in-focus object planes $50_L$ and $50_R$ of the respective image taking systems are on the automobile 61 and therefore, in the left and right images, the automobile 61 is smoothly connected, while the road sign 62 is behind the automobile 61 and therefore appears doubly in the two images.

Subsequently, the pairs of corresponding points of each image are sampled in the corresponding point sampling unit 33 shown in FIG. 2. As a typical corresponding point sampling method, there is the template matching method. This method is to consider, for example, a template surrounding a certain point in the left image, and determine a corresponding point by the comparison of the similarity of the right image to the image of the template. The correlation method which is a method of comparison of similarity is to take the correlation between the pixel value in the image of the template and the pixel value in a searched-for image, and use the coordinates in which the correlation assumes a maximum value as a corresponding point, and the relational expression thereof is shown below.

$$\sigma(m_R, n_R, m_L, n_L) = \frac{\sum_{i,j} R(m_R - i, n_R - j) \cdot L(m_L + i, n_L + j)}{\sqrt{\sum_{i,j} R^2(m_R - i, n_R - j)} \cdot \sqrt{\sum_{i,j} L^2(m_L + i, n_L + j)}} \quad (1)$$

In equation (1), $R(m_R, n_R)$ and $L(m_L, n_L)$ are the pixel values of the right and left images, and $\sigma(m_R, n_R, m_L, n_L)$ represents the degree of correlation. Also, $m_R$, $n_R$, $m_L$ and $n_L$ indicate pixel coordinates. It is because the pixel coordinates axis shown in FIGS. 4A and 4B is defined so as to be bisymmetrical that in the square sum or product sum calculation, the signs before i and j become converse between the right and left images. In the normalized correlation of equation (1), the maximum value is 1.

In the present embodiment, with regard to the pixel points in the area $55_R$ of the right image shown in FIG. 4B, the values of equation (1) corresponding to all points in the area $55_L$ of the left image are first calculated, and the pairs of coordinates of the right and left images which assume a maximum value are calculated. Next, of the calculated pairs of coordinates, a pair of corresponding points which become a double image is adopted with regard only to a case where the value σ of equation (1) is equal to or greater than a predetermined threshold value σth, that is, $\sigma \geq \sigma_{th}$. This is at least necessary to prevent the deterioration of the synthesized image by it being erroneously judged to be a double image, because in the case of the wide image taking systems of the present embodiment, of the area projected onto the in-focus object planes $50_L$ and $50_R$, the double image non-generating area occupies a considerable portion.

After the pairs of corresponding points of the left and right images are sampled, the area division of the double image is effected by the double image area-dividing unit 34 shown in FIG. 2. In the double image area-dividing process, the positions of the pairs of corresponding points in three-dimensional space are found by the trigonometrical survey method shown below.

Figure 6:
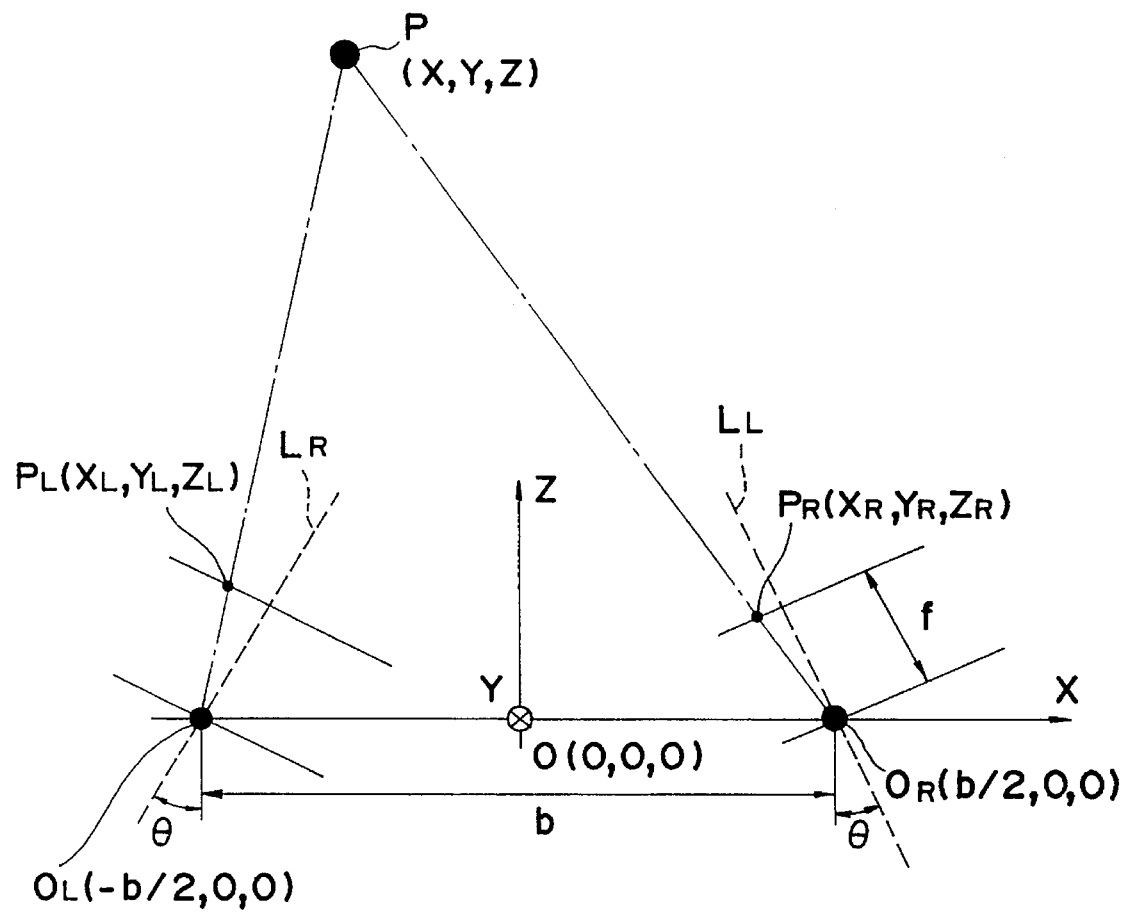
FIG. 6 is for illustrating the tigonometrical survey method when the area division by a double image area-dividing unit shown in FIG. 2 is effected.

When as shown in FIG. 6, the center points $O_L$ and $O_R$ of the object side principal planes of the left and right image pickup lens units $11_L$ and $11_R$ (see FIG. 3) are disposed line-symmetrically on the X axis with respect to the Z axis and the length of a base line linking the center points $O_L$ and $O_R$ together is a base line length b, the coordinates of the center points $O_L$ and $O_R$ are represented by (−b/2,0,0) and (b/2,0,0), respectively. Also, the projection points on the left and right CCD sensors $13_L$ and $13_R$ when a point P in three-dimensional space is projected toward the center points $O_L$ and $O_R$ are $P_L$ and $R_R$, respectively, and the coordinates of the points P, $P_L$ and $P_R$ are represented by (X, Y, Z), $(X_L, Y_L, Z_L)$ and $(X_R, Y_R, Z_R)$, respectively. Here, a plane formed by linking the three points P, $P_L$ and $P_R$ in three-dimensional space together is called an epipolar plane, and the line of intersection between the epipolar plane and the sensor surface is called an epipolar line.

At this time, the coordinates (X, Y, Z) of the point P are given by equations (2), (3) and (4) shown below.

$$X = (b/2) \cdot \frac{\{X_L+(b/2)\}/Z_L + \{X_R-(b/2)\}/Z_R}{\{X_L+(b/2)\}/Z_L - \{X_R-(b/2)\}/Z_R} \quad (2)$$

$$Y = \frac{Y_R}{Z_R} \cdot Z = \frac{Y_L}{Z_L} \cdot Z \quad (3)$$

$$Z = \frac{b}{\{X_L+(b/2)\}/Z_L - \{X_R-(b/2)\}/Z_R} \quad (4)$$

On the other hand, when the angle formed by the optical axes $L_L$ and $L_R$ of the left and right image pickup lens units $11_L$ and $11_R$ with respect to a straight line passing through the center points $O_L$ and $O_R$ of the object side principal planes thereof and parallel to the Z axis (this angle is called a convergence angle) is defined as θ and the focal length of each image pickup lens unit $11_L$, $11_R$ is f, there are established the relations that $Z_R = \{X_R-(b/2)+f\cdot\sin(\theta)\}\tan(\theta)+f\cdot\cos(\theta)$ $Z_L = -\{X_L+(b/2)-f\cdot\sin(\theta)\}\tan(\theta)+f\cdot\cos(\theta)$ and the coordinates (X, Y, Z) of the point P are calculated from the above equations.

There is then found a histogram in which the point P (X, Y, Z) is the positions of the pairs of corresponding points of the double image and the Z coordinates value thereof (the distance in the direction of depth) is a parameter. From this histogram, area division is effected with an area in which the depth distance becomes discontinuous as the boundary.

Figure 7:
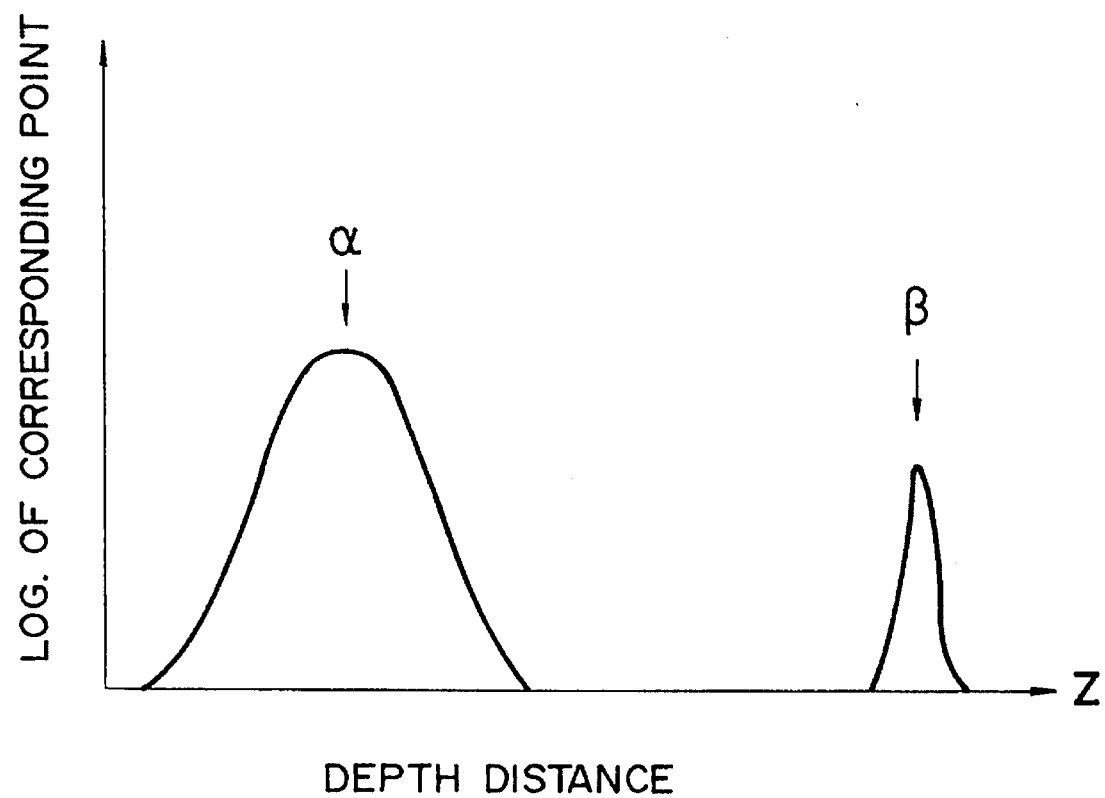
FIG. 7 is a histogram obtained by the double image area-dividing unit shown in FIG. 2 when the composition shown in FIG. 5 is image-picked up.

For example, in the case of the images shown in FIG. 5, there is obtained a histogram as shown in FIG. 7 wherein the image is divided into two areas α and β. That is, the area shown in FIG. 7 corresponds to the automobile 61 shown in FIG. 5, and the area β shown in FIG. 7 corresponds to the road sign 62 shown in FIG. 5.

After the area division is effected, the area-divided double images are subdivided into four modes shown below, by the double image mode-discriminating judging unit 35 shown in FIG. 2. That is, in the images shown in FIG. 4B, they are the following four modes:

(Mode 1): a double image including a point on the line of intersection $D_R$ and not including any point on the line of intersection $D_L$;

(Mode 2): a double image not including any point on the line of intersection $D_R$ and including a point on the line of intersection $D_L$;

(Mode 3): a double image not including any point on the line of intersection $D_R$ and not including any point on the line of intersection $D_L$; and (Mode 4): a double image including a point on the line of intersection $D_R$ and including a point on the line of intersection $D_L$. With regard to the double image mentioned as Mode 1, the sum total S1 of the area thereof is found and also, with regard to the double image mentioned as Mode 2, the sum total S2 of the area thereof is found. In the present embodiment, the double images mentioned as Mode 3 and Mode 4 are not subjected to any special processing.

Then, if the area S1 found by the double image mode-discriminating judging unit 35 is greater than or equal to the area S2, only the double image corresponding points existing in the right image are left and the corresponding points in the left image are removed, by double image area in either image simultaneous-removal unit 36 shown in FIG. 2. If conversely, the area S1 is smaller than the area S2, only the double image corresponding points existing in the left image are left and the corresponding points in the right image are removed. This is based on the concept that if the area of the double image mentioned as Mode 1 is great, the-double image in the right image is more connected with the area in which no double image is generated, and if the area of the double image mentioned as Mode 2 is great, the double image in the left image is more connected with the area in which no double image is generated.

When the corresponding points in one image are removed, the pixels after the removal are subjected to post-processing such as the substitution of the value from the surrounding pixel, by the after-removal processing unit 37 shown in FIG. 2. Thereafter, the left and right images are connected together and held in the synthesized image memory 39, and are output to the image output unit 40 such as a monitor.

Figure 8:
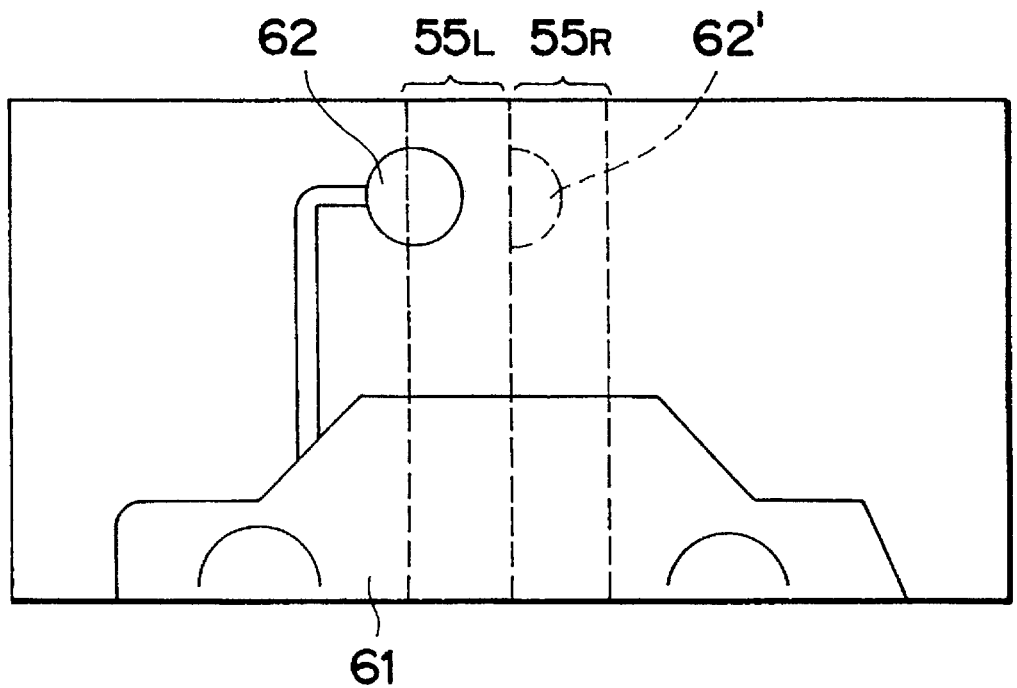
FIG. 8 shows a synthesized image obtained by synthesizing the left and right projected images shown in FIG. 5 by an image processing portion shown in FIG. 2.

FIG. 8 shows an image obtained by the left and right images shown in FIG. 5 being subjected to the above-described processing and connected together. As shown in FIG. 8, the road sign lying rearwardly of the in-focus object planes $50_L$ and $50_R$ (see FIG. 3) is classified as the afore-described Mode 2, and the double image 62' in the area $55_R$ of the left image is removed. On the other hand, the automobile 61 is classified as Mode 4 and therefore is not particularly subjected to processing, but it is substantially on the in-focus object planes $50_L$ and $50_R$ and therefore is continuously connected. Thereby, a natural image free of the generation of a double image is obtained.

One double image is removed by the processing as described above, whereby there can be left a double image component of the left and right images in which a component connected to the area in which no double image is generated is greater and therefore, there can be obtained a synthesized image having a large portion smoothly connected to the area in which no double image is generated.

Second Embodiment

Figure 9:
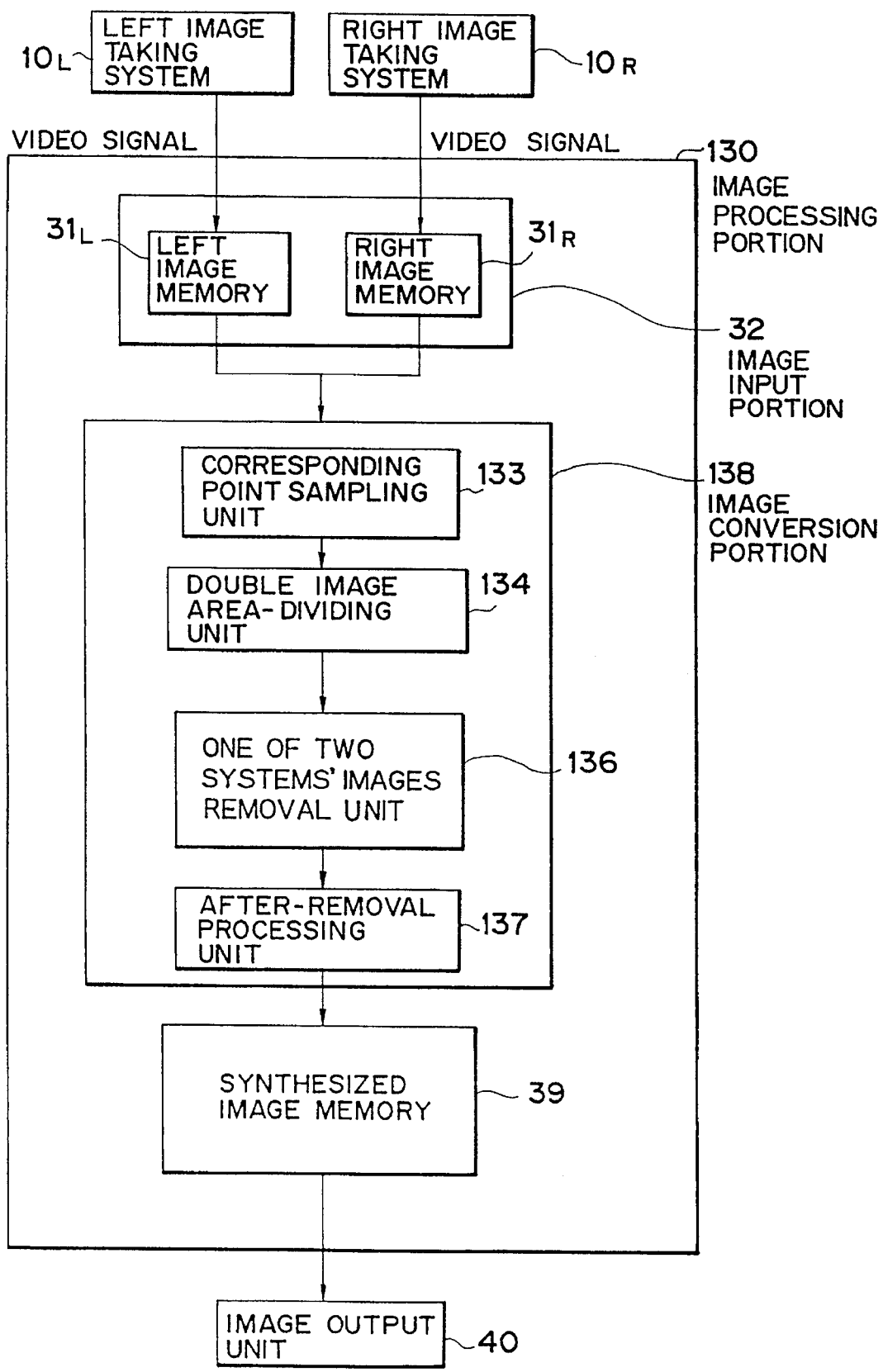
FIG. 9 is a block diagram of an image processing portion in a second embodiment of the double-eye image pickup apparatus of the present invention.

A second embodiment of the double-eye image pickup apparatus of the present invention will now be described. FIG. 9 is a block diagram of an image processing portion in the second embodiment of the double-eye image pickup apparatus of the present invention. The present embodiment is similar in construction to the first embodiment shown in FIGS. 1, 3, 4A and 4B except for the construction of the image processing portion and therefore, portions similar to those of the first embodiment are given similar reference numerals and need not be described. The construction of the image processing portion will hereinafter be described.

As shown in FIG. 9, the image processing portion 130 has an image input portion 32 comprising a left image memory $31_L$ and a right image memory $31_R$ for holding video signals from the CCD sensors $13_L$ and $13_R$ (see FIG. 1) of image taking systems $10_L$ and $10_R$, respectively, an image conversion portion 138 for forming a synthesized image on the basis of left and right images obtained from the video signals input to the image input portion 32, and a synthesized image memory 39 for holding the image synthesized by the image conversion portion 138 and outputting it to an image output unit 40. The image conversion portion 138 is subdivided into a corresponding point sampling unit 133 for sampling the pairs of corresponding points in the two images input to the image input portion 32 which are between the two images with regard to all pixels of a double image generating area, a double image area-dividing unit 134 for calculating the position of each corresponding point from the result of the sampling of the pairs of corresponding points, and effecting the area division of the double image by that information, an either image of two systems removal unit 136 for leaving at least one double image and using it as synthesized image forming data, on the basis of the areas divided by the double image area-dividing unit 134, and an after-removal processing unit 137 for applying post-processing to the image after the double image is removed.

Figure 10:
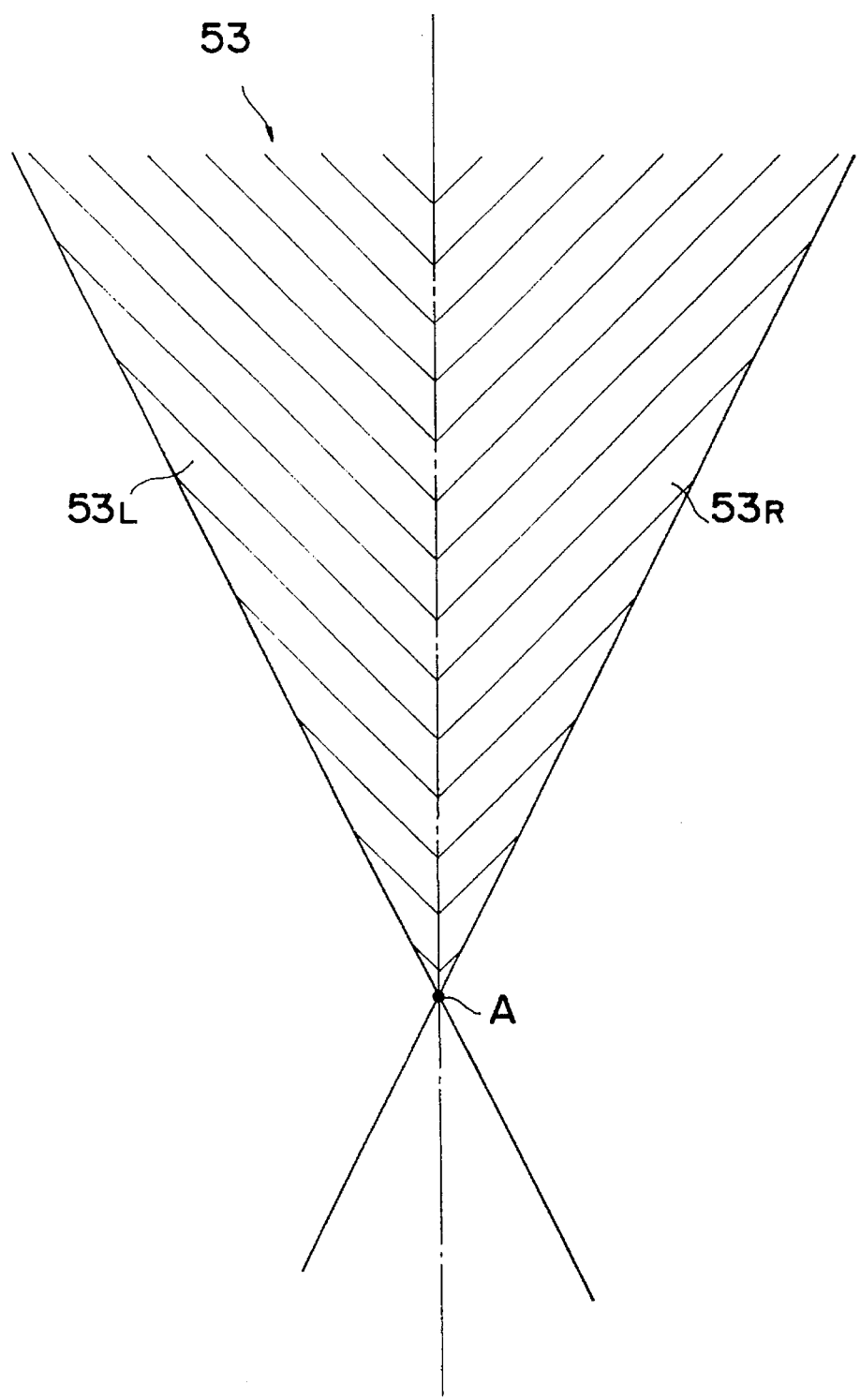
FIG. 10 is an enlarged view of the area of the essential portions of the optical system shown in FIG. 3 which is indicated by hatching, for illustrating the image processing procedure of the second embodiment of the double-eye image pickup apparatus of the present invention.

The image processing procedure of the present embodiment will now be described. In the arrangement as shown in FIGS. 3 and 4A, it is often the case that the main object is located in the central portion of the panoramic synthesized image and moreover in the in-focus portion centering around the line of intersection A. Therefore, when another object exists on the background of the main object, in the right image, the image of said another object appears at the right of the main object, and in the left image, the image of said another object appears at the left of the main object, and said another object becomes a double image. In this case, if as shown in FIG. 10, the area 53 shown in FIG. 3 is bisected into a left area 53L and a right area 53R, the image of said another object in the right image is considered to be continuously or smoothly connected to the image from the right area and likewise, the image of said another object in the left image is considered to be connected to the image from the left of the left area 53L.

On the basis of the above-described consideration, image reconstruction attaching importance to the continuity of the image is effected in the present embodiment. For this purpose, the process of leaving the image of the object existing in the right area 53R in the right image shown in FIG. 4B and leaving the image of the object existing in the left area 53L in the left image shown in FIG. 4B is carried out. Judgment as to whether the object exists in the right area 53R or in the left area 53L can be done by finding the pairs of corresponding points of the double image by a corresponding point sampling method similar to that adopted in the first embodiment, and when the typical point coordinates $(m_L, n_L)$ of the image $60_L$ shown in FIG. 4B and the typical point coordinates $(m_R, n_R)$ of the image $60_R$ shown in FIG. 4B are here considered to be a pair of corresponding point coordinates after the corresponding point sampling process, actually the following branching-off processes can be carried out as viewed from the positional relation between the images $60_L$ and $60_R$:

(a) To leave the image of the object in the right image if $m_R > m_L$;

(b) To leave the image of the object in the left image of $m_R < m_L$; and (c) To leave the image of the object in the left and right images if $m_R = m_L$.

With regard to the removed pixel, for example, the post-process of substituting the signal value of the pixel around it for it can be carried out. The left and right images formed by the above-described processing are synthesized so as to join each other on the lines of intersection A and A', whereby there can be obtained a panoramic synthesized image having no discontinuous portion created in the main object area and in which the creation of discontinuity in the background image area, i.e., the generation of a double image, is minimized.

A further effect of the present embodiment is that since the lines of intersection A and A' which are the end portions of the in-focus object planes $50_R$ and $50_L$ are controlled so as to always coincide with each other, the image of the main object always becomes continuous and-smooth and also, an image within a predetermined range of angle of field can always be photographed even during the movement of the in-focus object planes $50_L$ and $50_R$ resulting from any change in the distance of the main object.

Third Embodiment

Figure 11:
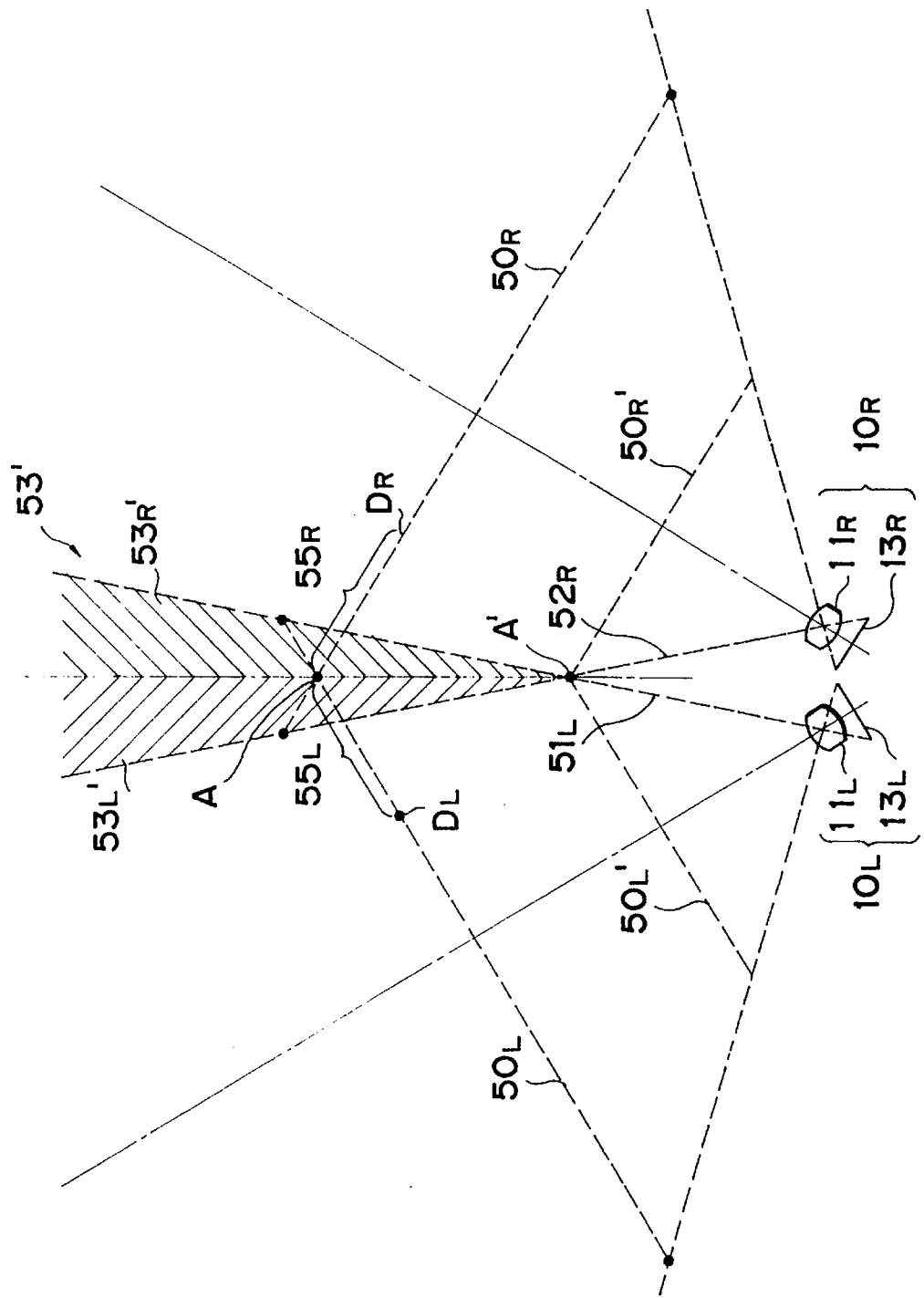
FIG. 11 is a view of the essential portions of an optical system in a third embodiment of the double-eye image pickup apparatus of the present invention as they are seen in a direction perpendicular to a plane formed by the optical axes of image pickup lens units.

A third embodiment of the double-eye image pickup apparatus of the present invention will now be described. This embodiment differs in the convergence angles of the left and right image taking systems from the second embodiment, and will hereinafter be described with reference to FIG. 11. FIG. 11 is a view of the essential portions of an optical system in the third embodiment of the double-eye image pickup apparatus of the present invention as they are seen in a direction perpendicular to a plane formed by the optical axes of image pickup lens units. In FIG. 11, portions similar to those shown in FIG. 3 are given the same reference characters and the schematic construction of the apparatus which is not shown is similar to that of the second embodiment and therefore need not be described.

As shown in FIG. 11, the convergence angles of left and right image taking systems $10_L$ and $10_R$ are controlled so that the point of intersection between end surfaces $51_L$ and $52_R$ which are the end surfaces of the effective object areas of the image taking systems $10_L$ and $10_R$ may coincide with the line of intersection A' between the in-focus object planes $50_L'$ and $50_R'$ of the image taking systems $10_L$ and $10_R$ during close-up photographing. In this case, the in-focus distance is varied by the zooming of image pickup lens units $11_L$ and $11_R$ and the end surfaces $51_L$ and $52_R$ which are the end surfaces of the effective object areas are varied with the fluctuation of the effective angle of field caused by zooming and therefore, the control of the convergence angles is effected in operative association with zoom control. Focusing and zoom control are effected as in the first embodiment. Also, the positions of the in-focus object planes $50_L$ and $50_R$ are calculated from the out signal values of focus encoders $24_L, 24_R$ (see FIG. 1) and zoom encoders $25_L, 25_R$ (see FIG. 1).

Figure 12:
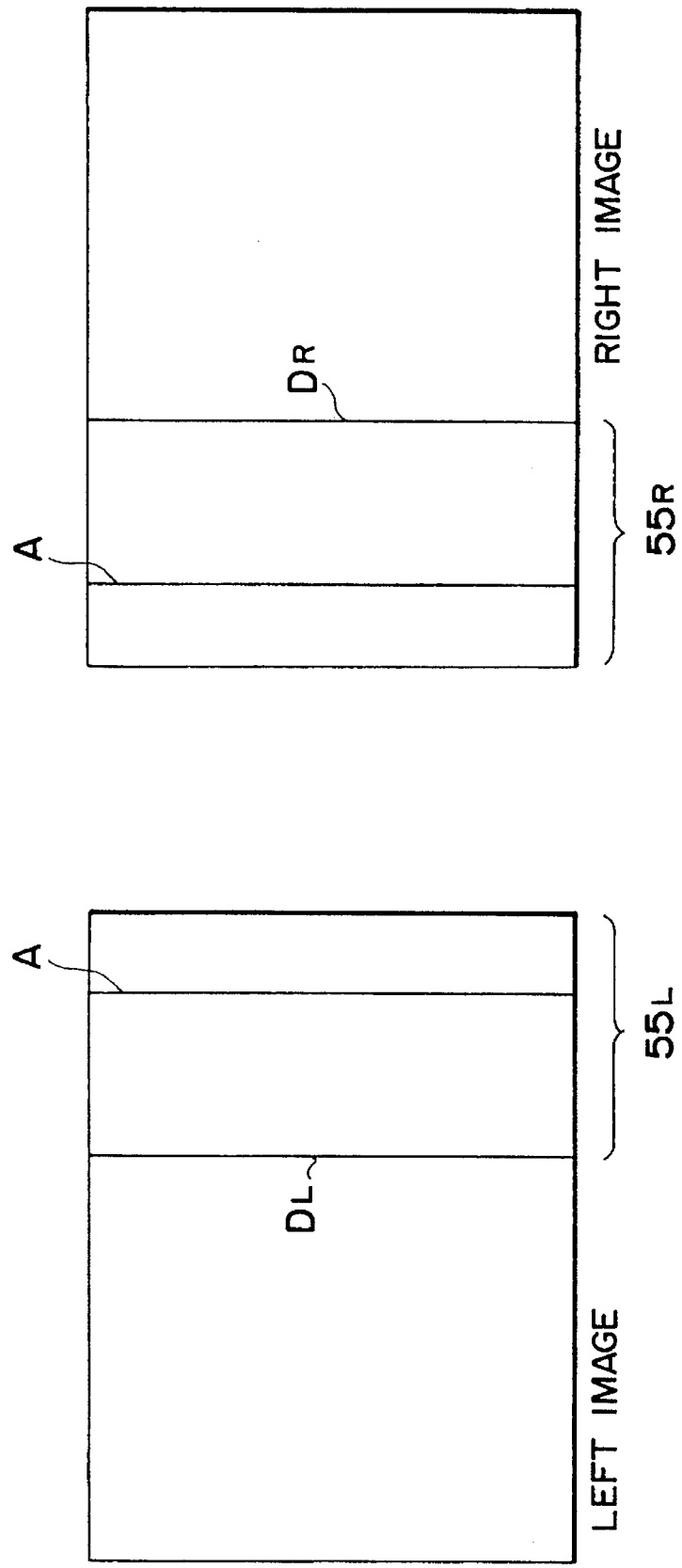
FIG. 12 is a view of the effective light receiving portions of left and right CCD sensors shown in FIG. 11 as they are seen from the image pickup lens unit side.

In the construction of the present embodiment, there is the possibility that an object existing in an area 53' indicated by hatching in FIG. 11 is photographed as a double image. The object existing in this area 53', as in the first embodiment, is projected onto CCD sensors $13_L$ and $13_R$ so as to apparently exist in areas $55_L$ and $55_R$ on the in-focus object planes $50_L$ and $50_R$ of the left and right image taking systems. FIG. 12 is a view of the effective light receiving portions of the left and right CCD sensors as they are seen from the image pickup lens unit side. It is to be understood here that the pixel coordinates values of left and right images are defined by $(m_L, n_L)$ and $(m_R, n_R)$, respectively, as in the case of FIG. 4B.

The image processing procedure of the present embodiment will now be described with reference to FIGS. 11 and 12. In the present embodiment, the following three processes are carried out to form a panoramic synthesized image from the left and right image s:

① Sampling of the pairs of corresponding points in the areas $55_L$ and $55_R$;

② The removal of one image based on the positional relation between the pairs of corresponding points in the areas $55_L$ and $55_R$; and ③ The synthesizing process for continuously connecting the image on the line of intersection A between the in-focus object planes $50_L$ and $50_R$.

Of these, the sampling of the pairs of corresponding points mentioned under item ① above can be realized by a processing method similar to that in the second embodiment.

The removal of one image mentioned under item ② above will now be described.

The main object, as in the second embodiment, is often located in the central portion of the panoramic synthesized image and moreover near the in-focus portion centering around the line of intersection A between the in-focus object planes $50_L$ and $50_R$ of the left and right image taking systems $10_L$ and $10_R$. Accordingly, again in the present embodiment, image reconstruction attaching importance to the continuity of image is effected on the basis of consideration similar to that shown in the second embodiment. So, the area 53', as in the second embodiment, is considered to be bisected into a right area $53_L{}'$ and a left area $53_R{}'$, and the following three branching-off processes are carried out on the basis of the above-described pixel coordinates values.

(a) To leave the image of the object in the right image if $m_R > m_L$;

(b) To leave the image of the object in the left image if $m_R < m_L$; or (c) To leave the image of the object in the left and right images if $m_R = m_L$.

The continuous synthesizing process mentioned under item ③ above will now be described.

First, in FIG. 12, the area in the right image which is at the left of the line of intersection A and the area in the left image which is at the right of the line of intersection A are deleted. Subsequently, the two images after the deletion are made coincident with each other on the line of intersection A and synthesized, whereby there is obtained a panoramic synthesized image having no discontinuous portion created in the main object area and in which the creation of discontinuity in the background image area, i.e., the generation of a double image, is minimized.

Fourth Embodiment

Figure 13:
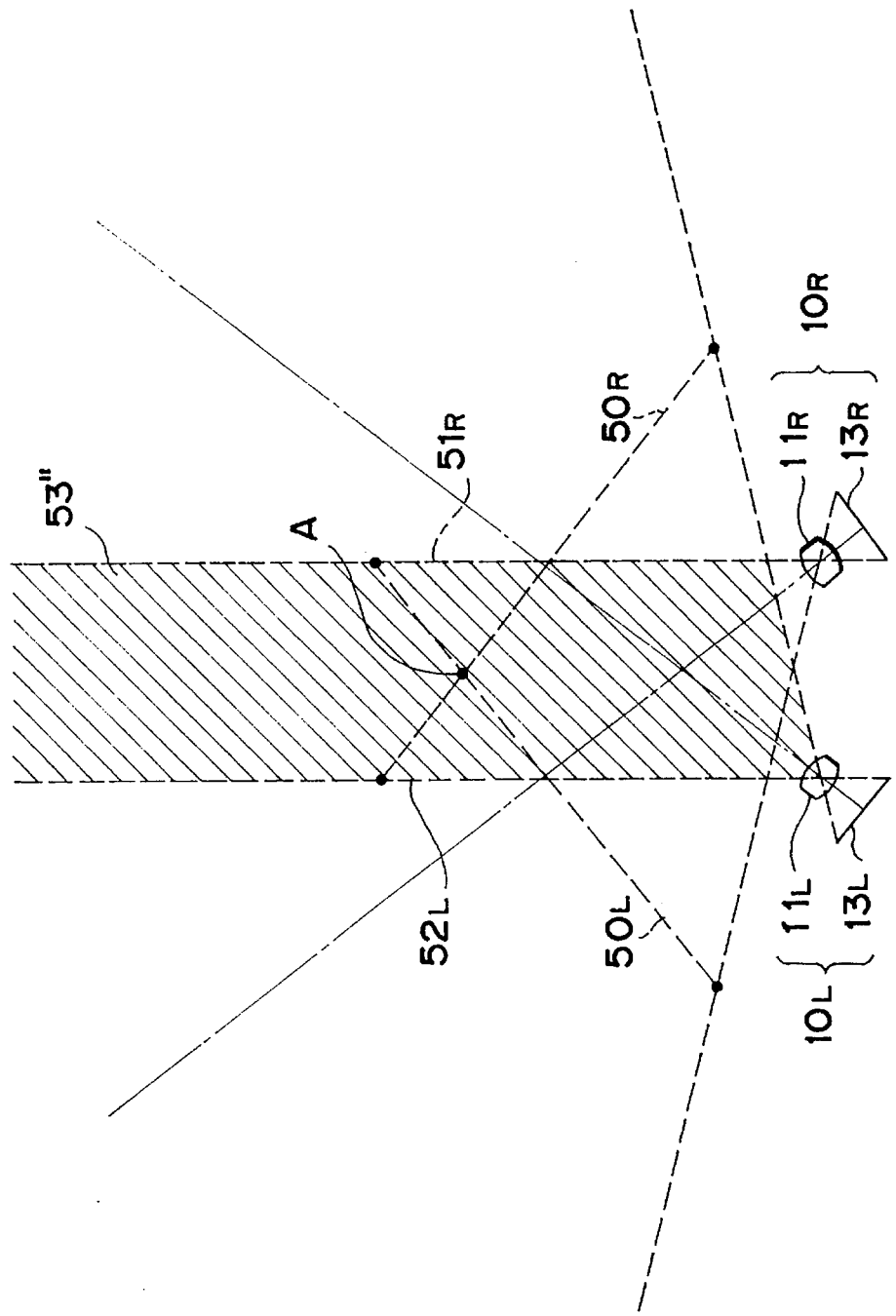
FIG. 13 is a view of the essential portions of an optical system in a fourth embodiment of the double-eye image pickup apparatus of the present invention as they are seen in a direction perpendicular to a plane formed by the optical axes of image pickup lens units.

A fourth embodiment of the double-eye image pickup apparatus of the present invention will now be described. This embodiment differs in the convergence angles of the left and right image taking systems from the second and third embodiments, and will hereinafter be described with reference to FIG. 13. FIG. 13 is a view of the essential portions of an optical system in the fourth embodiment of the double-eye image pickup apparatus of the present invention as they are seen in a direction perpendicular to a plane formed by the optical axes of image pickup lens units in FIG. 13, portions similar to those shown in FIG. 3 are given the same reference characters and the schematic construction of the apparatus which is not shown is similar to that of the second embodiment and therefore need not be described.

As shown in FIG. 13, the convergence angles of the left and right image taking systems $10_L$ and $10_R$ are controlled so that end surfaces $51_R$ and $52_L$ which are the end surfaces of the effective object areas of the image taking systems $10_L$ and $10_R$ may interest each other at infinity, that is, may be parallel to each other. In this case, it is necessary that the control of the convergence angles be effected in operative association with zoom control, as described in connection with the third embodiment. Focusing and zoom control are effected as in the first embodiment.

Figure 14:
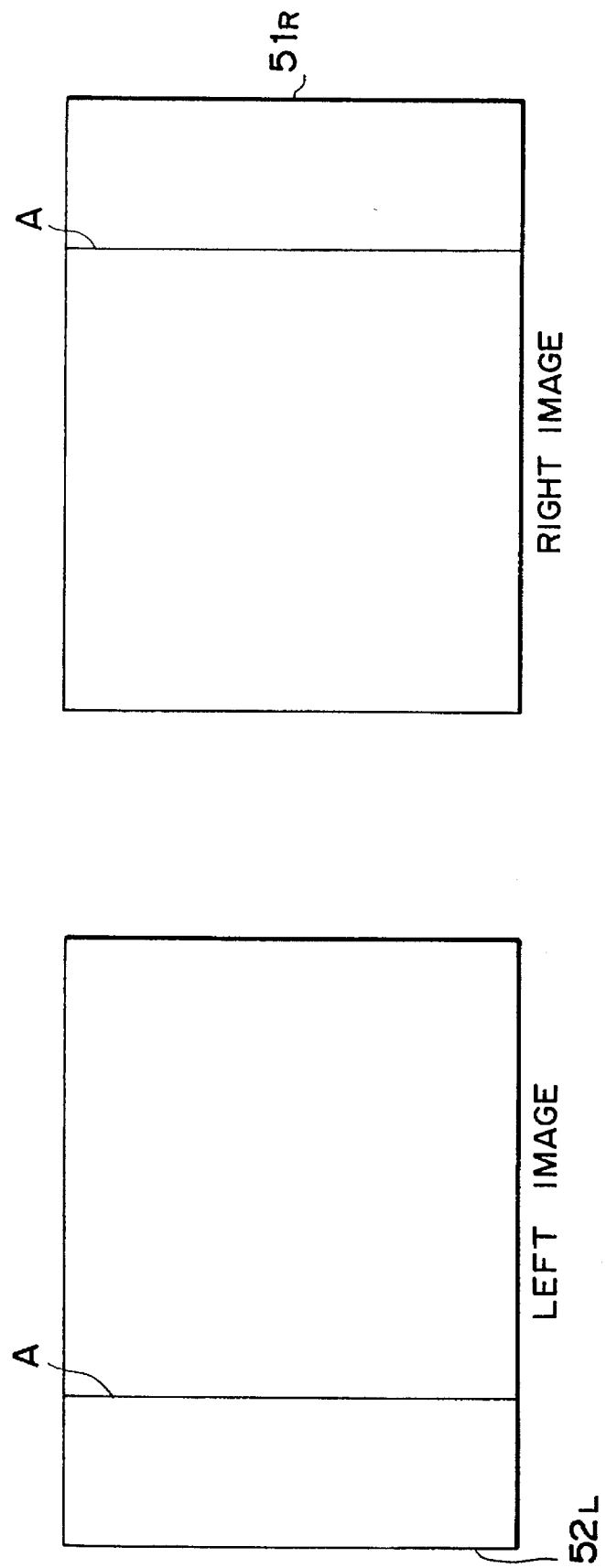
FIG. 14 is a view of the effective light receiving portions of left and right CCD sensors shown in FIG. 13 as they are seen from the image pickup lens unit side.

In the construction of the present embodiment, there is the possibility that an object existing in an area 53" indicated by hatching in FIG. 13 is photographed as a double image. When this area 53" is projected onto CCD sensors $13_L$ and $13_R$ through image pickup lens units $11_L$ and $11_R$, this area 53" spreads over the whole area of the effective light receiving portions of the CCD sensors 13 and 13. FIG. 14 is a view of the effective light receiving portions of the left and right CCD sensors as they are seen from the image pickup lens unit side. It is to be understood here that the pixel coordinates values of left and right images are defined by $(m_L, n_L)$ and $(m_R, n_R)$, respectively, as in the case of FIG. 4B.

The image processing procedure of the present embodiment will now be described with reference to FIGS. 13 and 14. Again in the present embodiment, as in the third embodiment, the following three processes are carried out to form a panoramic synthesized image from the left and right images:

① The sampling of the pairs of corresponding points in the whole area of the images;

② The removal of one image based on the positional relation between the pairs of corresponding points in the whole area of the images; and ③ The synthesizing process for continuously connecting the image on the line of intersection A between the in-focus object planes $50_L$ and $50_R$.

The corresponding point sampling process mentioned under item ① above can be realized by a processing method similar to that in each of the above-described embodiments, but in the present embodiment, it is necessary that this process be carried out over the whole area of the effective light receiving portions.

With regard also to the one image removing process mentioned under item ② above, importance is attached to the continuity of image on the basis of consideration similar to that in the second embodiment, and with regard to each pair of corresponding point coordinates, the following branching-off processes can be carried out:

(a) To leave the image of the object in the left image if $m_R > m_L$;

(b) To leave the image of the object in the right image if $m_R < m_L$; or (c) To leave the image of the object in the left and right images if $m_R = m_L$. In the case of the present embodiment, this process is converse at left and right from that in the second and third embodiments.

With regard to the synthesizing process of item ③ above, in FIG. 14, the area in the right image which is at the right of the line of intersection A and the area in the left image which is at the left of the line of intersection A are deleted, whereafter the two images after the deletion are disposed with the left and right reversed so as to coincide with each other on the line of intersection A and are synthesized, whereby there is obtained a panoramic synthesized image having no discontinuous portion created in the main object area and in which the creation of discontinuity in the background image area, i.e., the generation of a double image, is minimized.

Fifth Embodiment

Figure 15:
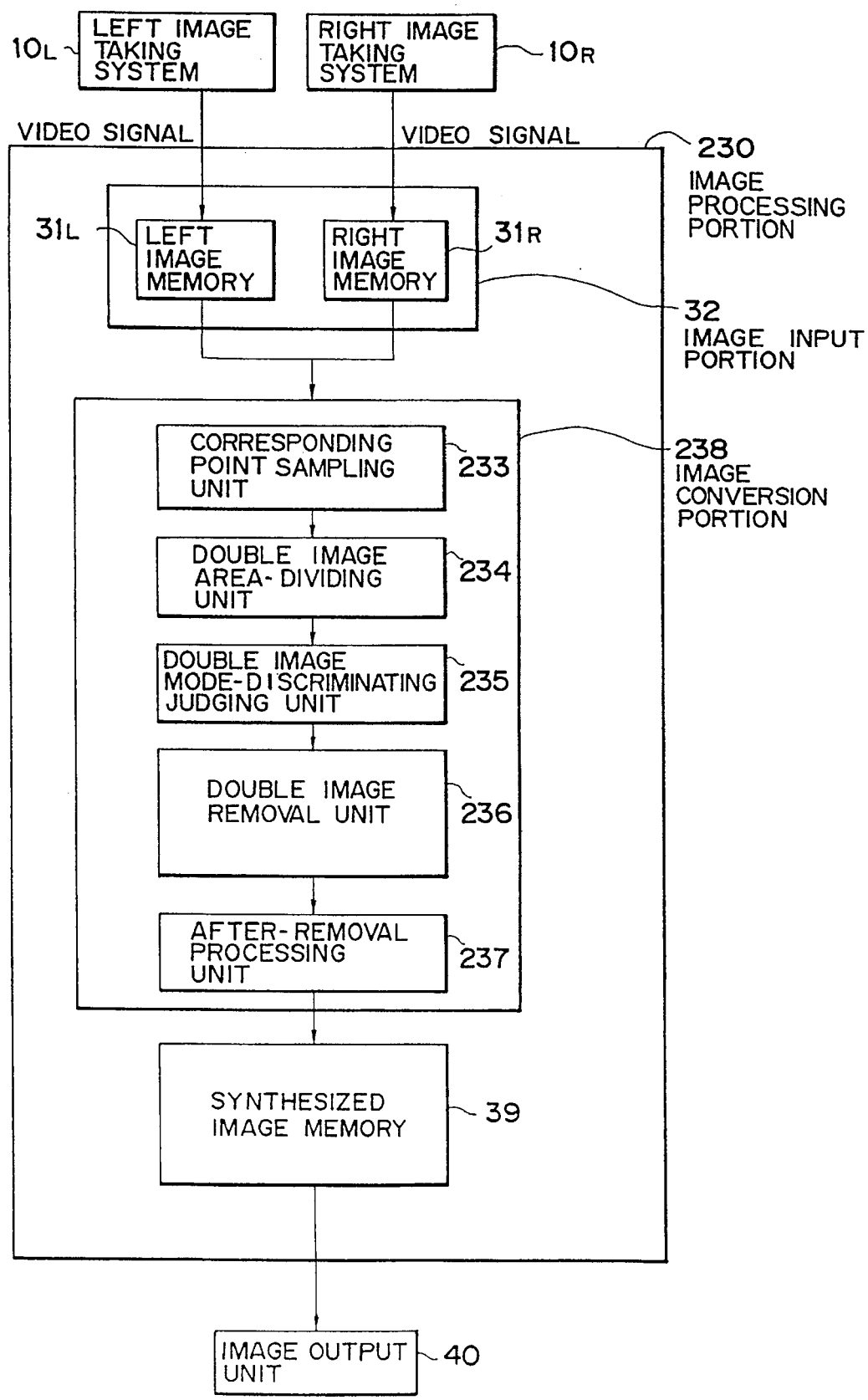
FIG. 15 is a block diagram of an image processing portion in a fifth embodiment of the double-eye image pickup apparatus of the present invention.

A fifth embodiment of the double-eye image pickup apparatus of the present invention will now be described. FIG. 15 is a block diagram of the image processing portion in the fifth embodiment of the double-eye image pickup apparatus of the present invention. This embodiment is similar in construction to the first embodiment shown in FIGS. 1, 3, 4A and 4B except for the construction of the image processing portion and therefore, portions similar to those of the first embodiment are given the same reference characters and need not be described. The construction of the image processing portion will hereinafter be described.

As shown in FIG. 15, the image processing portion 230 has an image input portion 32 comprising a left image memory $31_L$ and a right image memory $31_R$ for holding video signals from the CCD sensors $13_L$ and $13_R$ (see FIG. 1), respectively, of image taking systems $10_L$ and $10_R$, an image conversion portion 238 for forming a synthesized image on the basis of left and right images obtained from the video signals input to the image input portion 32, and a synthesized image memory 39 for holding the image synthesized by the image conversion portion 238 and outputting it to an image output unit 40. The image conversion portion 238 is subdivided into a corresponding point sampling unit 233 for sampling the pairs of corresponding points between two images input to the image input portion 232 with regard to all pixels of the double image generating area, a double image area-dividing unit 234 for calculating the three-dimensional position (distance information) of each pair of corresponding points from the results of the sampling of the pairs of corresponding points and effecting the area-division of the double image by that information, a double image mode-discriminating judging unit 235 for classifying each double image into three kinds of modes, i.e., whether the double image divided into areas is included in only the double image generating areas of the both images (the areas $55_L$ and $55_R$ shown in FIG. 4B), or included also in the double image non-generating area of one image (the area except the double image generating area), or included also in the double image non-generating areas of the both images, a common images of two systems' images removal unit 236 for removing one of the double image on the basis of the modes classified by the double image mode-discriminating judging unit 235 except the case where the double image exists also in the double image non-generating areas of the both images, and an after-removal processing unit 237 for carrying out the post-processing of effecting substitution or the like for the removing unit when the double image is removed, and laterally magnification-changing a predetermined portion when the double image is not removed.

The image processing procedure in the double-eye image pickup apparatus of the present embodiment will now be described.

When an object is first image-picked up by the left and right image taking systems $10_L$ and $10_R$, image information is input as a video signal from each of the image taking systems $10_L$ and $10_R$ to the image input portion 32 of the image processing portion 230, and is held in the respective image memories $31_L$ and $31_R$.

Subsequently, in the corresponding point sampling unit 233, the sampling of the corresponding points in the double image generating area is effected by a template matching method similar to that described in connection with the first embodiment and further, in the double image area-dividing unit 234, the positions of the pairs of corresponding points of each double image in three-dimensional space are found by the tigonometrical survey method or the line in a manner similar to that described in connection with the first embodiment, and a histogram having the Z coordinates values thereof as parameters is found and the area division of the double image is effected.

After the area division of the double image is effected, each area-divided double image is classified into the following four modes in the double image mode-discriminating judging unit 235. That is, in each image shown in FIG. 4B, the modes are the following four modes:

(Mode 1) a double image including a point on the line of intersection $D_R$ and not including any point on the line of intersection $D_L$;

(Mode 2) a double image not including any point on the line of intersection $D_R$ and including a point on the line of intersection $D_L$;

(Mode 3) a double image not including any point on the line of intersection $D_R$ and not including any point on the line of intersection $D_L$; and (Mode 4) a double image including a point on the line of-intersection $D_R$ and including a point on the line of intersection $D_L$.

The following processes differing between the four modes classified by the double image mode-discriminating judging unit 235 are carried out in the double image removing unit 236 and after-removal processing unit 237 shown in FIG. 15.

(Processing of Mode 1) The double image in the right image is left and the double image in the left image is removed. In the left image after the removal, the post-process of for example, substituting the values from the surrounding pixels for the pixels of the removed portion is carried out.

(Processing of Mode 2) Mode 2 corresponds to the road sign 62 in the images shown in FIG. 5, and in this case, processing converse at left and right from the processing of Mode 1 is carried out.

(Processing of Mode 3) One of the left and right double images is left and the other double image is removed. The post-processing is the same as the processing of Mode 1.

(Processing of Mode 4) One of the left and right double images is enlarged to double with respect to the lateral direction thereof and is synthesized so as to contact with the lines of intersection $D_L$ and $D_R$ shown in FIG. 4B. Or in order that it may be smoothly connected with the double image non-generating area, conversion may be done from the coordinates of the pairs of corresponding points of the left and right images by maps shown below, and then the left and right images may be enlarged to double with respect to the lateral direction thereof and synthesized so as to contact with the lines of intersection $D_L$ and $D_R$. Maps therefor include, for example, $X_S = (X_L \cdot d_R + X_R \cdot d_L)/(d_R + d_L)$ $Y_S = (Y_L \cdot d_R + Y_R \cdot d_L)/(d_R + d_L)$.

Here, it is to be understood that when left upper points in the areas $55_L$ and $55_R$ shown in FIG. 4B are the origins of the areas $55_L$ and $55_R$, respectively, the coordinates of the double image in the right image are represented by $(X_R, Y_R)$, the coordinates of the double image in the left image are represented by $(X_L, Y_L)$ and the coordinates of the synthesized image from the double image are represented by $(X_S, Y_S)$. Also, $d_R$ is the distance between the coordinates $(X_R, Y_R)$ of the double image in the right image and the line of intersection $D_R$, and $d_L$ is the distance between the coordinates $(X_L, Y_L)$ of the double image in the left image and the line of intersection $D_R$.

As described above, when the double image in the areas $55_L, 55_R$ is included in the double image non-generating area of the both images, that double image is enlarged to double in the lateral direction thereof, whereby there is obtained a synthesized image in which the double-image generating area is smoothly connected with the double image non-generating area.

Sixth Embodiment

A sixth embodiment of the double-eye image pickup apparatus of the present invention will now be described. This embodiment differs from the fifth embodiment in the processing of Mode 4 classified in the fifth embodiment. In the other points, this embodiment is similar to the fifth embodiment and therefore the characteristic portions thereof will hereinafter be described.

Figure 16A:
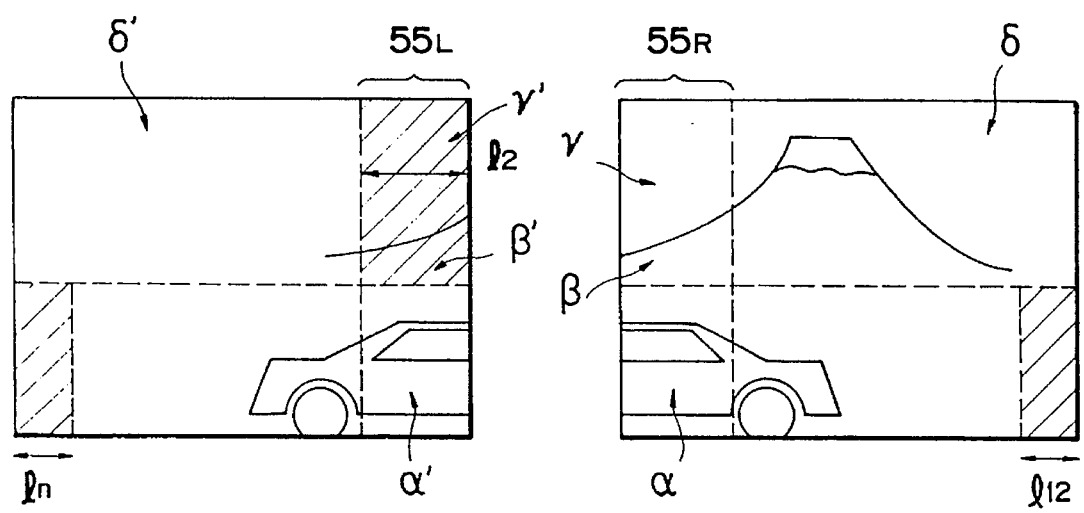
FIGS. 16A and 16B are views when a composition in which a mountain is seen on the background of an automobile is image-picked up, for illustrating the image synthesizing process in a sixth embodiment of the double-eye image pickup apparatus of the present invention, FIG. 16A showing left and right images before image synthesis, and FIG. 16B showing an image after image synthesis.
Figure 16B:
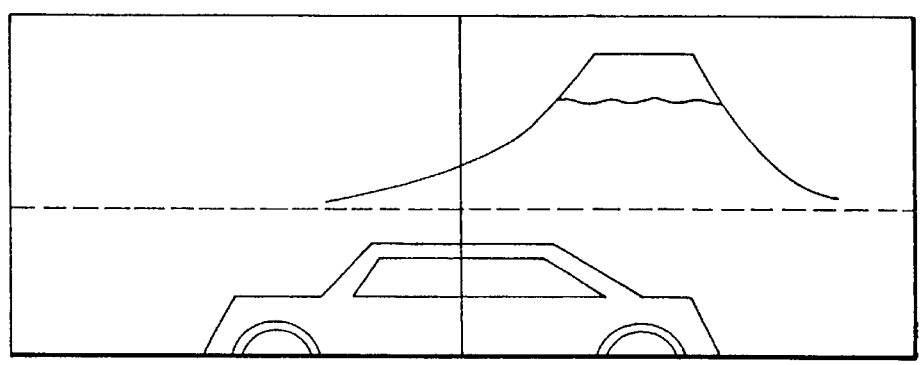

FIGS. 16A and 16B are for illustrating the image synthesizing process in the present embodiment, and are views in which a composition in which a mountain is seen on the background of an automobile which is a main object is image-picked up. In this case, by effecting the area division of the double image in a manner similar to that described in connection with the fifth embodiment, each of the left and right images is vertically bisected into an area including chiefly the automobile which is the main object and an area not including the automobile, as shown in FIG. 6A. Further, in areas $55_L$ and $55_R$ which are double image generating areas, lower areas are defined as $\alpha$ and $\alpha'$ and an upper area is considered by dividing it into the areas $\beta$ and $\beta'$ of the mountain and the background area $\gamma$ and $\gamma'$ thereof. Also, in the area except the areas $55_L$ and $55_R$, i.e., the double image non-generating area, upper areas are defined as $\delta$ and $\delta'$. In FIG. 16A, the pair of $\beta$ and $\beta'$ and the pair of $\gamma$ and $\gamma'$ become double images classified as Mode 4 in the fifth embodiment, and in the present embodiment, one of these double images is not enlarged to double in the lateral direction thereof, but one double image (the portion indicated by hatching in FIG. 6A and having a width $l_2$) is removed, whereafter in the right image, the right end portion of the lower area (the portion indicated by hatching in FIG. 16A and having a width $l_{12}$) is removed and also, in the left image, the left end portion of the lower area (the portion indicated by hatching in FIG. 16A and having a width $l_{11}$; $l_{11}=l_{12}$, $l_{11}+l_{12}=l_2$) is removed, and the whole image spreading at the left and right of the double image at the same proportion to the two upper and lower areas, i.e., the whole right area $\delta$ of the areas $\beta$ and $\gamma$ and the whole left area $\delta'$ of the areas $\beta'$ and $\gamma'$ are also laterally magnification-changed. By these being enlarged and synthesized, there is obtained a panoramic synthesized image as shown in FIG. 16B wherein the left and right images are smoothly connected together at the central portion of the image. When there is any portion which is not classified as Mode 4, the removing process and post-process shown in the fifth embodiment are carried out.

In the present embodiment, the end portions of the double image non-generating portion in the lower area are removed, but usually the main object is disposed in the central portion of the image and therefore, there will be not so great influence even if the end portions of the image are removed.

Also, in the present embodiment, there is shown an example in which the image is divided into two upper and lower areas, equal processing can also be carried out when the image is divided into three or more areas. Further, not only the lateral magnification changing process, but also the vertical magnification change can be effected at the same proportion as the lateral magnification change and the upper and lower end portions of the image are cut to provide a synthesized image, whereby there can also be obtained an image free of distortion in the length-to-width ratio.

Seventh Embodiment

Figure 17:
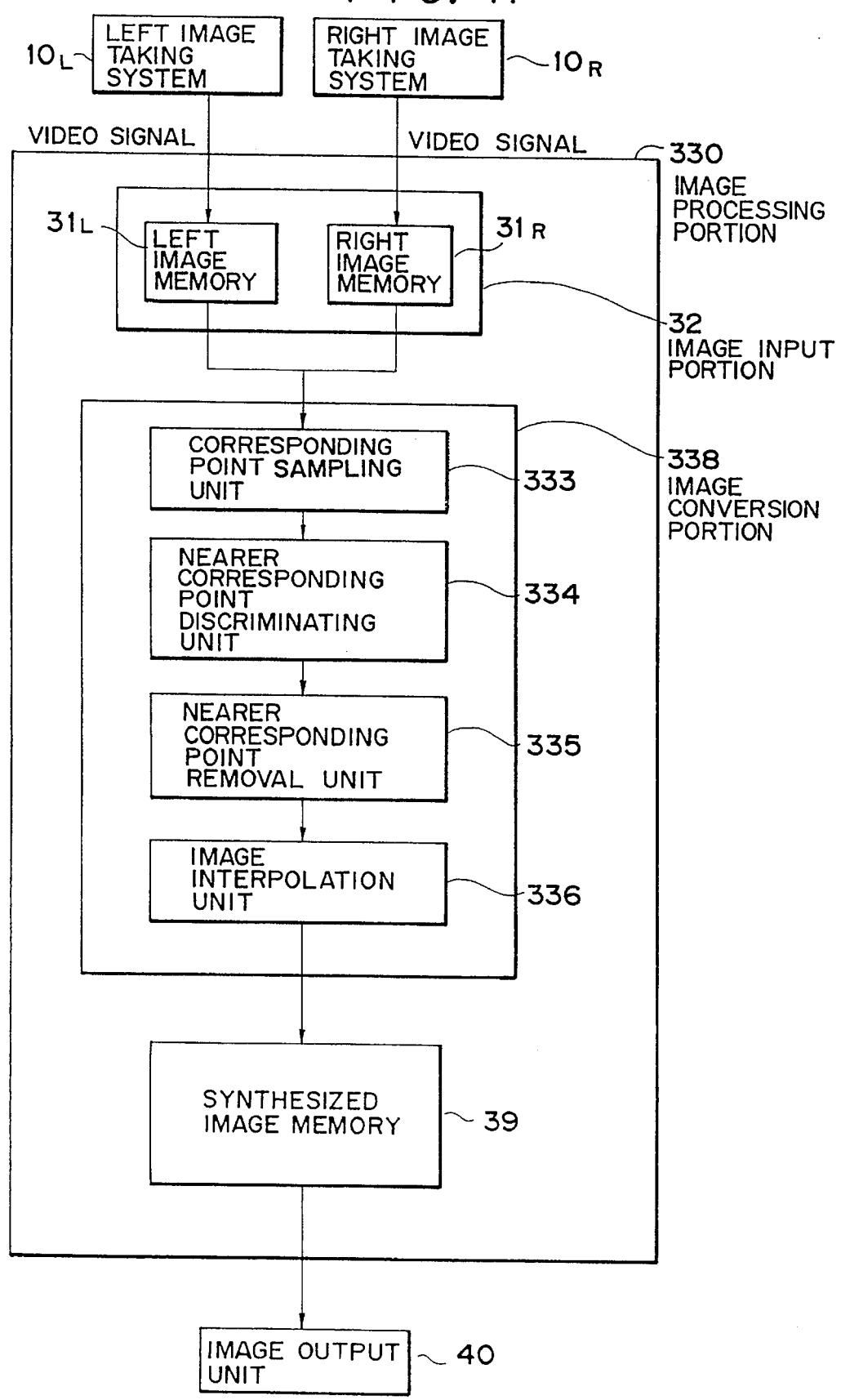
FIG. 17 is a block diagram of an image processing portion in a seventh embodiment of the double-eye image pickup apparatus of the present invention.

A seventh embodiment of the double-eye image pickup apparatus of the present invention will now be described. FIG. 17 is a block diagram of the image processing portion in the seventh embodiment of the double-eye image pickup apparatus of the present invention. This embodiment is for synthesizing two images obtained by image-picking up an object by the use of two image taking systems, i.e., the right image taking system $10_R$ and the left image taking system $10_L$, thereby obtaining a highly minute image, and the construction thereof is similar to that of the first embodiment shown in FIG. 1, except for the construction of the image processing portion and therefore, portions similar to those in the first embodiment are given similar reference characters and need not be described. The construction of the image processing portion will hereinafter be described.

As shown in FIG. 17, the image processing portion 330 has an image input portion 32 comprising a left image memory $31_L$ and a right image memory $31_R$ for holding video signals from the CCD sensors $13_L$ and $13_R$ (see FIG. 1), respectively, of the image taking systems $10_L$ and $10_R$, an image conversion portion 338 for forming a synthesized image on the basis of left and right images obtained from the video signals input to the image input portion 32, and a synthesized image memory 39 for holding the image synthesized by the image conversion portion 338 and outputting it to an image output unit 40. The image conversion portion 338 is subdivided into a corresponding point sampling unit 333 for sampling the pairs of corresponding points between the two images input to the image input portion 32 with regard to all pixels of the area of the two images which can become the object of the two image taking systems, a nearer corresponding point discriminating unit 334 for judging from the result of the sampling of the pairs of corresponding points whether the position of each corresponding point is far by a predetermined distance relative to the pixel position of a reference image, a nearer corresponding point removal unit 335 for removing, when it is judged that the position of the corresponding point is not far by the predetermined distance relative to the pixel position of the reference image, that corresponding point from data for synthesized image, and an image interpolation unit 336 for effecting an interpolation process to the reference image by using the corresponding points which have not been removed by the nearer corresponding point removal unit 335 as the data for synthesized image.

Figure 18:
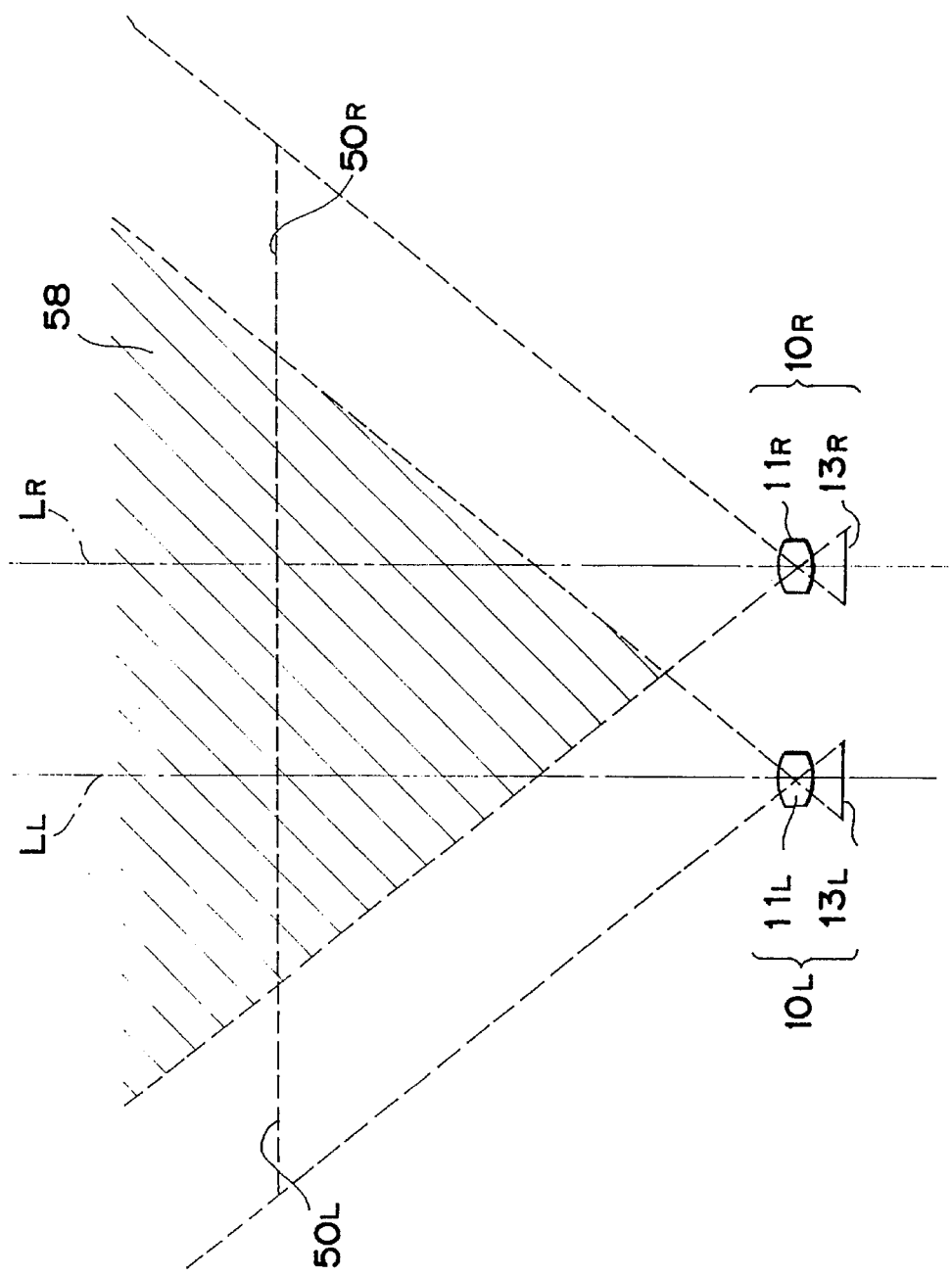
FIG. 18 is a view of the essential portions of an optical system in the seventh embodiment of the double-eye image pickup apparatus of the present invention as they are seen in a direction perpendicular to a plane formed by the optical axes of image pickup lens units.

FIG. 18 is a view of the essential portions of an optical system in the present embodiment as they are seen in a direction perpendicular to a plane formed by the optical axes of image pickup lens units. As shown in FIG. 18, the convergence angles of the left and right image taking systems $10_L$ and $10_R$ are controlled so that the respective optical axes $L_L$ and $L_R$ thereof may be parallel to each other. Also, the focuses and zoom of the image taking systems $10_L$ and $10_R$ are controlled so that the distances between and the imaging magnifications of the respective in-focus object planes $50_L$, $50_R$ and the CCD sensors $13_L$, $13_R$ may be equal at left and right, and the in-focus object planes $50_L$ and $50_R$ are formed on the same plane. Motors $14_L$, $14_R$ and $16_L$, $16_R$ (see FIG. 1) for controlling the focuses and zoom are driven through the control unit 20 (see FIG. 1) which has received signals form the encoders $24_L$, $24_R$ and $25_L$, $25_R$ (see FIG. 1) as in the first embodiment. In the present embodiment, an area 58 indicated by hatching is an area which can become the object of the left and right image taking systems $10_L$ and $10_R$, and an object existing in this area 58 is an object which becomes the subject of a highly minute image.

The image processing procedure in the double-eye image pickup apparatus of the present embodiment will now be described with reference to FIGS. 17 and 18.

When an object is first image-picked up by the left and right image taking systems $10_L$ and $10_R$, image information is input as a video signal from each of the image taking systems $10_L$ and $10_R$ to the image input portion 32 of the image processing portion 330, and is held in the respective image memories $31_L$ and $31_R$.

Subsequently, in the corresponding point sampling unit 333, the sampling of the pairs of corresponding points in the area 58 is effected by a template matching method similar to that described in connection with the first embodiment. In the present embodiment, however, pixel relative position accuracy of one pixel pitch or less is required and therefore, in order to effect the matching by an image low frequency component having little error, the size of the template can be made large, or before the matching calculation is effected, the process of sampling the low frequency component of the image can be carried out.

Figure 19:
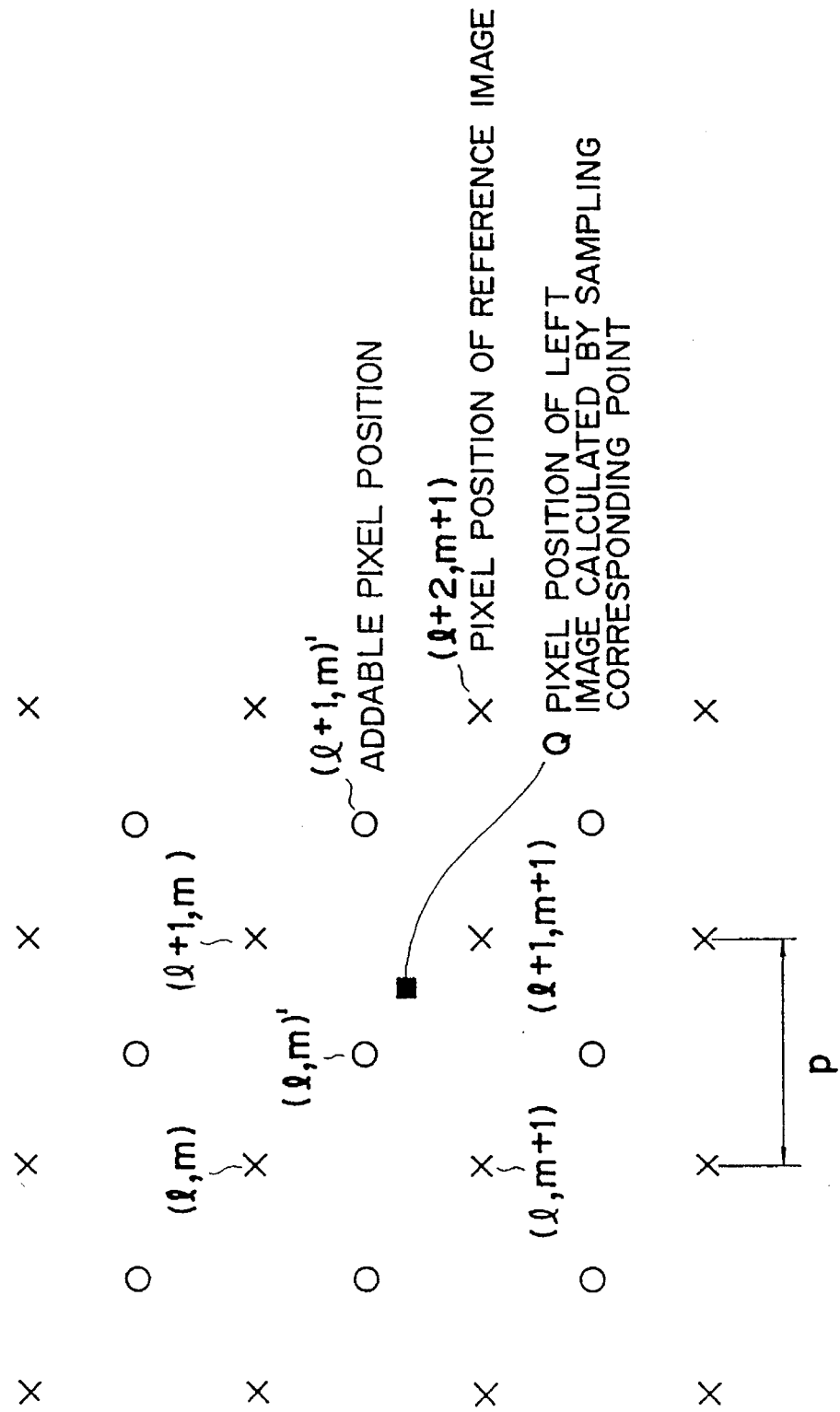
FIG. 19 shows the pixel positions of CCD sensors with respect to portions of left and right images obtained by the optical system shown in FIG. 18.

On the basis of this sampling of the pairs of corresponding points, the left image by the left image taking system $10_L$ is combined with the right image by the right image taking system $10_R$ to thereby obtain a highly minute image, and this processing will now be described with reference to FIG. 19. FIG. 19 represents the pixel positions of the CCD sensors with regard to parts of left and right images obtained by the optical system shown in FIG. 18. In FIG. 19, a point (l, m) indicated by a mark x shows the pixel position in the image by the right image taking system $10_R$ which provides a reference image for a highly minute synthesized image, and a point indicated by a mark ○ shows an addable pixel position (l, m)' in the highly minute synthesized image. On the other hand, a point Q indicated by a square mark shows the pixel position in the image by the left image taking system $10_L$ calculated by above-described sampling of the corresponding points.

Here, the distance of the square mark point Q relative to-one of x mark points is first calculated by the nearer corresponding point discriminating unit 334, and whether the distance is 1/10 or less of the pixel pitch P is judged. If as a result, said distance is 1/10 or less of the pixel pitch P, this square mark Q is removed from data for synthesized image by the nearer corresponding point removal unit 335, and is not used as a parameter for calculating the value of the ○ mark point (l, m)'. On the other hand, if said distance exceeds 1/10 of the pixel pitch P, this square mark point Q is intactly used as a parameter for calculating the value of the ○ mark point (l, m)'. Subsequently, the interpolation process of the image by the left image taking system $10_L$ is carried out to the image by the right image taking system $10_R$ by the image interpolation unit 336, but with regard to any of the case where the square mark point Q is used and the case where the square are mark point Q is not used, for example, the coordinates conversion method (IEEE Trans, Acoust, 33 (85) 1151) for a two-dimensional unequal interval sampling point can be used as an interpolation method of calculating the value of the ○ mark point. Here, of the image from the left image taking system $10_L$ which is not the reference image, the pixel point having no corresponding point on the reference image side from the right image taking system $10_R$ or the image point which is not calculated is of course not used as a parameter for determining the value of the ○ mark point (l, m)'.

The present embodiment described above has the effect that when the relative positions of the pixels in the left and right images are very proximate to each other, any unnecessary high frequency component created in sensitive reaction to the error of the relative pixel positions or a noise component in which pixel values are superposed one upon another can be suppressed. Thereby, such a situation that the synthesized image is more deteriorated in image quality than the reference image can be prevented.

In the present embodiment, there has been shown the case where the right image is the reference image, but converse image synthesis may of course be effected with the left image as the reference image.

Eighth Embodiment

Figure 20:
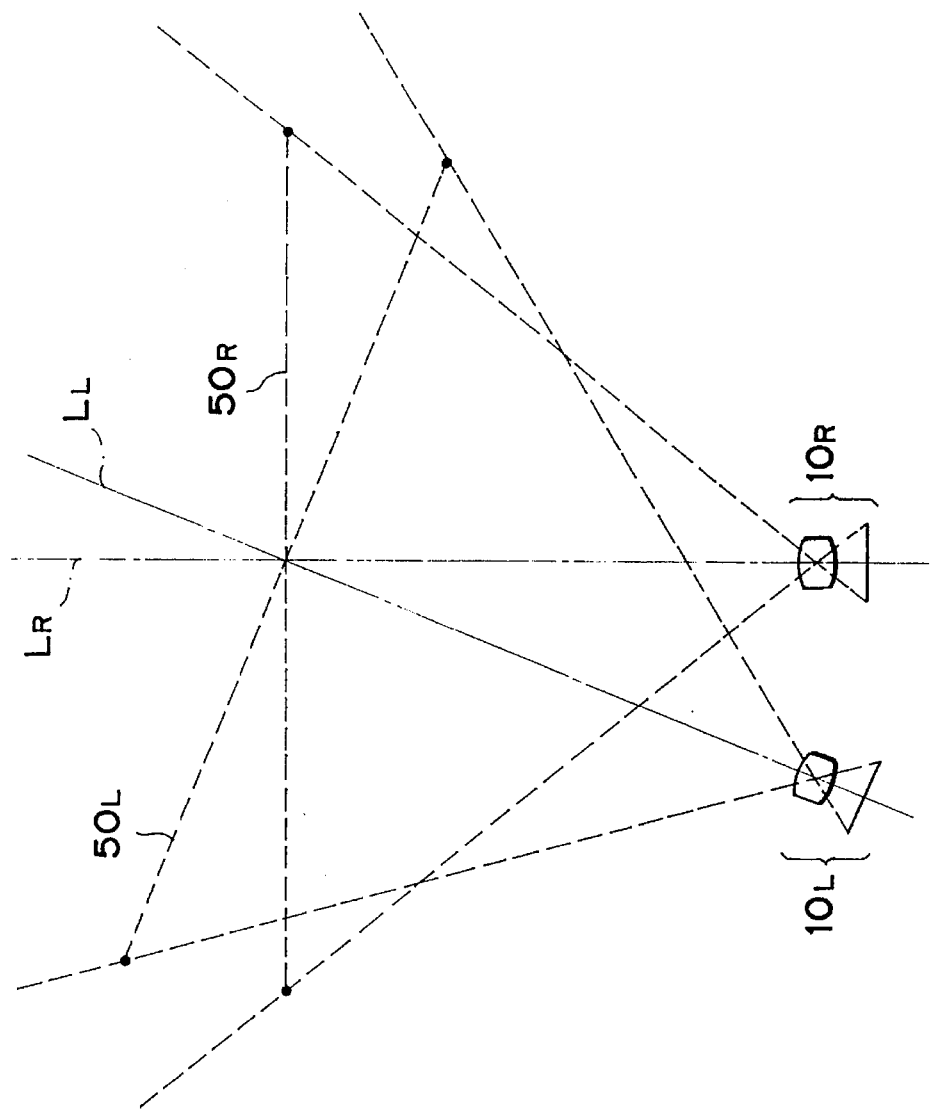
FIG. 20 is a view of the essential portions of an optical system in an eighth embodiment of the double-eye image pickup apparatus of the present invention as they are seen in a direction perpendicular to a plane formed by the optical axes of image pickup lens units.

An eighth embodiment of the double-eye image pickup apparatus of the present invention will now be described. This embodiment, like the seventh embodiment, is a double-eye image pickup apparatus for obtaining a highly minute image, and differs in the convergence angles of the left and right image taking systems from the seventh embodiment. FIG. 20 is a view of the essential portions of an optical system in the eighth embodiment of the double-eye image pickup apparatus of the present invention as they are seen in a direction perpendicular to a plane formed by the optical axes of image pickup lens units, and portions similar to those in the seventh embodiment are given the same reference characters.

As shown in FIG. 20, the convergence angle of the right image taking system $10_R$ of the left and right image taking systems $10_L$ and $10_R$ is fixed at zero degree, and the right image taking system $10_R$ is set so as to always face the front of an object (not shown) with the optical axis of the right image taking system $10_R$ directed toward the object. On the other hand, the convergence angle of the left image taking system $10_L$ is controlled so that the optical axis $L_L$ of the left image taking system $10_L$ may intersect the optical axis $L_R$ of the right image taking system $10_R$ on the point of intersection between the in-focus object planes $50_L$ and $50_R$ of the two image taking systems $10_L$ and $10_R$. The focus motor $14_L$ (see FIG. 1) and zoom motor $16_L$ (see FIG. 1) for the left image taking system $10_L$ are controlled so as to keep the positional relations between the in-focus object planes $50_L$, $50_R$ and the optical axes $L_L$, $L_R$ in operative association with the setting of the focus motor $14_R$ (see FIG. 1) and zoom motor $16_R$ (see FIG. 1) for the right image taking system $10_R$. The control of the motors $14_L$, $14_R$, $16_L$ and $16_R$ is effected through the control unit 20 (see FIG. 1) which has received signals from the encoders $24_L$, $24_R$, $25_L$ and $25_R$ (see FIG. 1), as in the seventh embodiment.

The present embodiment also is for forming a highly minute image with the input image from the right image taking system $10_R$ as the reference image, and the image forming method thereof is similar to that of the seventh embodiment and therefore need not be described.

In the present embodiment, the image from the image taking system having its optical axis fixed is used as the reference image and therefore, even if there exists a portion which cannot be highly minutely synthesized, at least the image from the front can always be output without being subjected to any special processing. Also, the image from the front relative to the apparatus is used as the reference image and therefore, even during the close-up photographing by the double-eye image pickup apparatus, the photographer can effect photographing without receiving any unnatural feeling of operation.

Ninth Embodiment

Figure 21:
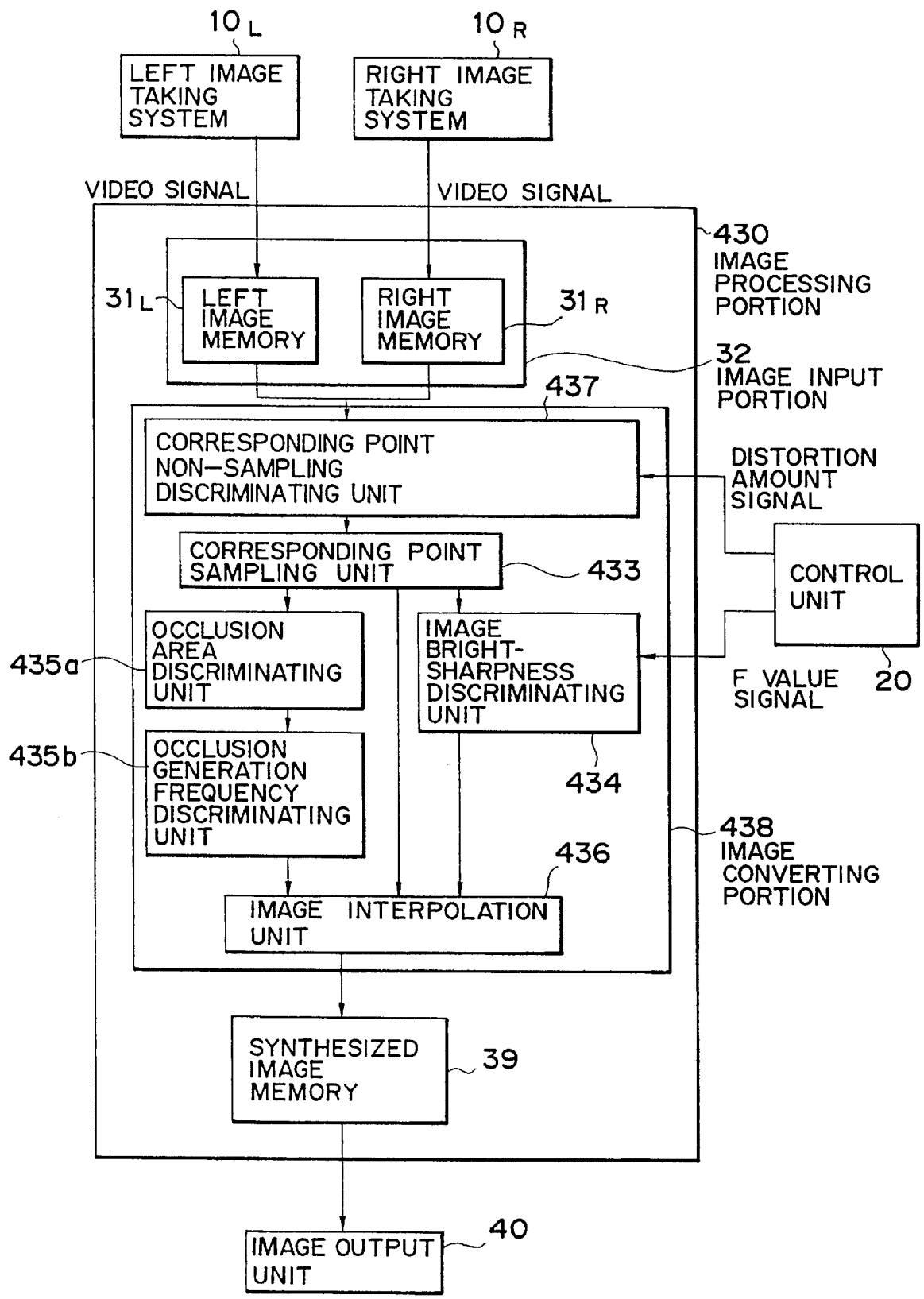
FIG. 21 is a block diagram of an image processing portion in a ninth embodiment of the double-eye image pickup apparatus of the present invention.
Figure 22:
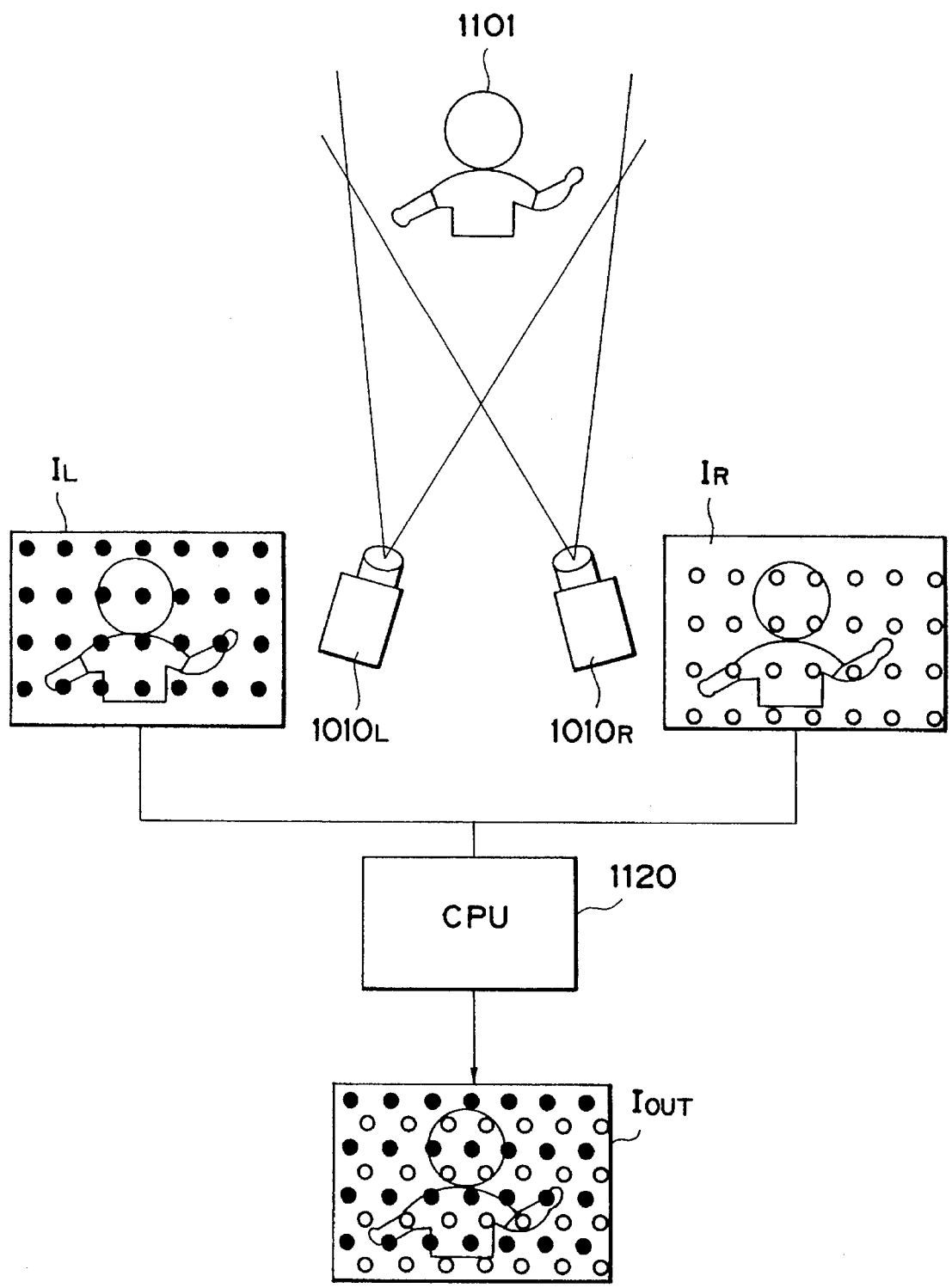
FIG. 22 is a view for illustrating the principle of a double-eye image pickup apparatus for synthesizing two images obtained by picking up the image of a common object by two image taking systems to thereby obtain a highly minute image.

A ninth embodiment of the double-eye image pickup apparatus of the present invention will now be described. FIG. 21 is a block diagram of the image processing portion in the ninth embodiment of the double-eye image pickup apparatus of the present invention. This embodiment differs only in the construction of the image processing portion from the seventh and heighth embodiments and is similar in the arrangement of the optical system and the other points to the seventh and eighth embodiments and therefore, portions similar to those in those embodiments are given the same reference characters as those in the first embodiment and need not be described, and only the differences of the present embodiment from the seventh and eighth embodiments will hereinafter be described.

(1) A corresponding point non-sampling area discriminating unit 437 for judging an area in which the sampling of pairs of corresponding points is not effected, on the basis of a distortion amount signal from the control unit 20 is provided before a corresponding point sampling unit 433, and as regards that portion of an image in which distortion is great and needs complicated correction, one image is not used as data for synthesized image.

In the marginal portion of the input image, the distortion of the image resulting from the distortion of the left and right image pickup lens units (not shown) and from the fact that the optical axes of these image pickup lens units are not parallel to each other becomes great and therefore, it is necessary that highly accurate correction of the distortion be effected before the sampling of the pairs of corresponding points is effected. On the other hand, when an ordinary natural image or the like is to be picked up, the resolving power required for the marginal portion of the image is low as compared with that required for the central portion of the image and therefore, there may be a case where the highly minute synthesis in the marginal portion of the image is not very much required. Copying with such a situation, in the marginal portion of the image, an output image is obtained by the use of one input image alone. Even in such case, the correction of distortion becomes necessary, but since the accuracy required in such case is low as compared with that required when synthesis is done, the purpose can be achieved by the use of an easier processing method.

(2) Provision is made of an image bright-sharpness discriminating unit 434 for presuming the degree of blur of the image from the F value (numerical aperture) from the control unit 20 after the sampling of the pairs of corresponding points by the corresponding point sampling unit 433, and as regards that portion of the image which deviates from the in-focus object plane and in which blur is great, one image is not used as data for synthesized image.

In the image bright-sharpness discriminating unit 434, how far the corresponding point on the object is from the in-focus object plane is calculated from the information of the sampling of the pairs of corresponding points effected at each point on the input image, and the degree of blur of the image is presumed from this distance information and the F values (numerical apertures) of the left and right image pickup lens units. With regard to a portion in which the synthesis effect is judged to be small as a result of the comparison of this degree of blur with the pixel density of the CCD sensor (not shown), an output image is obtained by the use of one input image alone. Thereby, a part of the synthesizing process such as interpolation can be omitted.

(3) Provision is made of an occlusion area discriminating unit 435a for judging, after the sampling of the pairs of corresponding points by the corresponding point sampling unit 433, whether an occlusion area exists, and an occlusion generation frequency discriminating unit 435b for calculating an area appearing with a component of a predetermined frequency or higher, from the occlusion area judged by the occlusion area discriminating unit 435a, and with regard to that area, preventing one image from being used as data for synthesized image.

The occlusion area refers to an area which, when at a point in one image, a corresponding point is not found in the other image by the process of sampling the pairs of corresponding points, comprises these points. In an object wherein such occlusion area appears often and complicatedly in the image, erroneous correspondence between corresponding points becomes liable to occur, and this results in the deterioration of the synthesized image. Accordingly, one input image alone is used in a complicated occlusion area. As a specific example of the method, with regard to each pixel point of each input image, the presence or absence of corresponding points in the other image is memorized in a memory, and an area having a component in which the localized spatial frequency of the variation in the presence or absence of corresponding points is a predetermined frequency or higher is calculated. With regard to this area, the outputting process is carried out by the use of one input image alone.

The change of the processing procedure accompanying the blur of image or the occlusion mentioned under items (2) and (3) above can be done with regard to a corresponding area alone, or when the rate which that area occupies in the image exceeds a predetermined limit, selection by which, with regard to the entire image area, an output image is obtained by the use of one input image alone may be effected. In any case, the degree of improvement or deterioration of the quality of the combined output image is foreseen and one or both input images are selected.

Also, in the present embodiment, there have shown three techniques, whereas of course, these techniques need not be effected at a time, but each technique independently has an effect.

In the above-described embodiments except the seventh embodiment in which the left and right image taking systems $10_L$ and $10_R$ are disposed so that their optical axes $L_L$ and $L_R$ may be parallel to each other, the in-focus object planes $50_L$ and $50_R$ of the left and right image taking systems $10_L$ and $10_R$, respectively, are not on the same plane. Therefore, some geometrical distortion occurs in the connected portion of the images. Further, in the case of the eighth embodiment in which one of the image taking systems is set so as to face the front of the object, some blur occurs in at least one of points in the object which should correspond to each other. In order to prevent this, the light receiving surfaces of the CCD sensors $13_L$ and $13_R$ of the left and right image taking systems $10_L$ and $10_R$ can also be disposed at a predetermined angle with respect to the respective optical axes $L_L$ and $L_R$ so that the in-focus object planes $50_L$ and $50_R$ of the left and right image taking systems $10_L$ and $10_R$ may be disposed on the same plane. With regard to the geometrical distortion, the distortion correcting process can be carried out to the input image.

Also, in the first embodiment, etc., the left and right image taking systems $10_L$ and $10_R$ are disposed so that the end portions of their in-focus object planes $50_L$ and $50_R$ may coincide with each other, but in order to absorb the occurrence of any error of the mechanism control system, the end portions of these in-focus object planes $50_L$ and $50_R$ can be disposed partly in superposed relationship with each other, and the correspondence between the images in the superposed portion can be effected and on the basis thereof, the synthesizing process can also be carried out.

Further, the optical arrangement in each of the above-described embodiments, the left and right image taking systems $10_L$ and $10_R$ are disposed bisymmetrically and the effective light receiving portions of the CCD sensors $13_L$ and $13_R$ are disposed so as to be symmetrical about the optical axes $L_L$ and $L_R$ of the image taking systems $10_L$ and $10_R$, whereas the present invention is not restricted to such disposition. For example, the CCD sensors $13_L$ and $13_R$ may be disposed at a predetermined angle with respect to the optical axes $L_L$ and $L_R$, whereby it is also possible to form the left and right in-focus object planes $50_L$ and $50_R$ on a plane. Also, the CCD sensors $13_L$ and $13_R$ can assume a disposition deviated in a direction perpendicular to the optical axes.

Also, in each of the above-described embodiments, the double-eye image taking system has been shown as comprising two image taking systems $10_L$ and $10_R$, whereas the number of the image taking systems is not limited two, but may be three or more. The image pickup elements are not restricted to the CCD sensors $13_L$ and $13_R$, but may be ones using, for example, image pickup tubes, or image pickup elements having a color resolving system removed therefrom and having mosaic-like color filters disposed in the light receiving portions thereof.

The present invention, which is constructed as described above, has the following effects.

By having an image processing portion which samples pairs of corresponding points corresponding to the same portion of an object from each image signal, and with regard to at least some of the sampled pairs of corresponding points, uses at least one corresponding point of said some pairs of corresponding points as synthesized image forming data and does not use the other corresponding points as synthesized image forming data, the deterioration of the synthesized image can be prevented.

In the formation of a panoramic synthesized image, a double image generated near the connected portion of two images can be removed and the good connection of the image with the double image non-generating area can be kept.

Also, in the formation of a highly minute image, when adjacent corresponding points of pairs of corresponding points are very proximate to each other, at least one corresponding point of that pair of corresponding points is used as synthesized image forming data and the other corresponding point is not used as synthesized image forming data, whereby any unnecessary high frequency component created in sensitive reaction to the error of the relative pixel position of the pair of corresponding points or a noise component superposed on the pixel value can be suppressed. Further, in the formation of a highly minute image, with regard to at least some of pairs of corresponding points which requires distortion correction before the sampling of corresponding points, or pairs of corresponding points in which the degree of blur of image foreseen from the distance from the in-focus object plane of each image taking system and the numerical aperture of each imaging optical system exceeds a predetermined threshold value, or pairs of corresponding points which appear at a predetermined spatial frequency or higher alternately with a pixel point for which corresponding points forming a pair are not found and an area in which the corresponding points forming said pair are not found, one corresponding point of said some pairs of corresponding points is used as said synthesized image forming data, whereby the little effective and unnecessary processing procedure in a distorted image portion, a blurred image portion and an occlusion image portion can be omitted and also the deterioration of image by wrong correspondence can be suppressed.

Further, one of the image signals is used as a reference image for synthesized image formation and the other image signal is used as an auxiliary image, whereby an image having at least a predetermined level of image quality can always be output.

Particularly, the image taking system having the image pickup element outputting the image signal which provides the reference image is disposed with the optical axis of the imaging optical system thereof looking toward said object, whereby the image from at least the front of the object can always be output without being subjected to any special processing and even during close-up photographing, the photographer can effect photographing without receiving any unnatural feeling of operation.

What is claimed is:

1. A double-eye image pickup apparatus comprising:

a plurality of imaging optical systems;

a plurality of image pickup elements, wherein one of said plurality of image pickup elements changes an objective image formed by one of said plurality of imaging optical systems to an image signal and another one of said plurality of image pickup elements changes another objective image formed by another one of said plurality of imaging optical systems to another image signal; and an image processing means for generating a combined image by using image signals from said plurality of image pickup elements, wherein said image processing means executes the following steps of:

(a) extracting a plurality of pairs of corresponding points in said objective image and said another objective image, (b) obtaining information as to a distance from each corresponding point of said pairs of corresponding points to a point on an object located in each image signal, (c) separating said pairs of corresponding points into at least two regions on the basis of said information as to the distance to the point from each of said corresponding points, and (d) regarding pairs of corresponding points in a region, using image data indicated by some of said corresponding points of said pairs of corresponding points for generation of a combined image and not using an image data indicated by other corresponding points of said pairs of corresponding points for generation of said combined image, a predetermined after-processing being applied to pixel portions of the image data which are not used for generation of said combined image.

2. A double-eye image pickup apparatus according to claim 1, wherein said combined image includes a panoramic synthesized image comprising said image signals juxtaposed and combined together.

3. A double-eye image pickup apparatus according to claim 2, wherein said image processing means, with regard to any pair of corresponding points of said pairs of corresponding points which belongs to an image connected to a double-image non-generating area image-picked up only by one image pickup element, uses as said combined image forming data the corresponding point of said pair of corresponding points which is most probably connected to said double image non-generating area.

4. A double-eye image pickup apparatus according to claim 2, wherein said image processing means, with regard to any pair of corresponding points of said pairs of corresponding points of which the distances from a double image non-generating area image-picked up only by one image pickup element differ, uses as said combined image forming data the corresponding point which is nearest to said double image non-generating area.

5. A double-eye image pickup apparatus according to claim 2, wherein said image processing means, with regard to any pair of corresponding points of said pairs of corresponding points which belongs to an image connected to a double image non-generating area image-picked up only by one image pickup element, uses the a corresponding point in said image as said combined image forming data, and with regard to a corresponding point belonging to another image connected to another double image non-generating area, moves the corresponding point in one of said images in the direction of juxtaposition of said images and uses it as said combined image forming data.

6. A double-eye image pickup apparatus according to claim 1, wherein said combined image is a highly minute image comprising said image signals combined together.

7. A double-eye image pickup apparatus according to claim 6, wherein said image processing means, with regard to a pair of corresponding points of said pairs of corresponding points in which the spacing between the corresponding points is smaller than a predetermined spacing, uses one corresponding point of said pair of corresponding points as said combined image forming data.

8. A double-eye image pickup apparatus according to claim 6, wherein said image processing means, with regard to at least some of said pairs of corresponding points which require a correction of distortion before the extraction of said corresponding points, uses one of said corresponding points as combined image forming data.

9. A double-eye image pickup apparatus according to claim 6, wherein said image processing means, with regard to at least some of said extracted pairs of corresponding points in which a degree of blur of image foreseen from the distance from an in-focus object plane of each of said image pickup elements and a numerical aperture of each of said imaging optical systems exceeds a predetermined threshold value, uses one corresponding point of said pairs of corresponding points as said combined image forming data.

10. A double-eye image pickup apparatus according to claim 6, wherein said image processing means, with regard to at least some of said pairs of corresponding points which appear at a predetermined spatial frequency or higher alternately with a pixel point in which corresponding points forming said pair are not found, after said pairs of corresponding points are sampled, uses one corresponding point of said pairs of corresponding points as said combined image forming data.

11. A double-eye image pickup apparatus comprising:

a plurality of imaging optical systems;

a plurality of image pickup elements, wherein one of said plurality of image pickup elements changes an objective image formed by one of said plurality of imaging optical systems to an image signal and another one of said plurality of image pickup elements changes another objective image formed by another one of said plurality of imaging optical systems to another image signal;

an image processing means for generating a combined image by using the image signals from said plurality of image pickup elements, wherein said image processing means executes the following steps of:

(a) defining an image indicated by one of said image signals as a base image and an image indicated by said other image signal as a supplemental image, (b) sampling a plurality of pairs of corresponding points in said base image and said supplemental image, (c) obtaining predetermined information as to each pair of corresponding points, and (d) from among said pairs of corresponding points on the basis of said predetermined information, using either image data indicated by said corresponding points at a side of said base image for generation of a combined image or image data indicated by said corresponding points at a side of said supplemental image for generation of said combined image, a predetermined after-processing being applied to pixel portions of the image data at said side of said supplemental image which are not used for generation of said combined image.

12. A double-eye image pickup apparatus according to claim 11, wherein said image pickup element outputting the image signal which provides said base image has an optical axis of its imaging optical system disposed toward said object.

13. An double-eye image pickup apparatus according to claim 11, wherein said combined image is a panoramic combined image comprising said image signals juxtaposed and combined together, and said image processing means, with regard to any pair of corresponding points of said pairs of corresponding points which belongs to an image connected to a double image non-generating area image-picked up only by one image pickup element, uses the image signal which is most probably connected to said double image non-generating area as a base image.

14. A double-eye image pickup apparatus according to claim 11, wherein said combined image is a highly minute image comprising said image signals combined together, and said image processing means, with regard to any pair of corresponding points of said pairs of corresponding points in which the spacing between the corresponding point in said supplemental image is smaller than a predetermined spacing, uses the corresponding point in said base image as said combined image forming data, and does not use the corresponding point in said supplemental image as said combined image forming data.

15. A double-eye image pickup apparatus according to claim 12, wherein said combined image is a highly minute image comprising said image signals combined together, and said image processing means, with regard to the pair of corresponding points of said pairs of corresponding points in which the spacing between the corresponding point in said base image and the corresponding point in said supplemental image is smaller than a predetermined spacing, uses the corresponding point in said base image as said combined image forming data, and does not use the corresponding point in said supplemental image as said combined image forming data.

16. A double-eye image pickup apparatus according to claim 11, wherein said combined image is a highly minute image comprising said image signals combined together, and said image processing means, with regard to at least some of said pairs of corresponding points which require a correction of distortion before the extraction of the corresponding points, uses the corresponding point in said base image as said combined image forming data, and does not use the corresponding point in said supplemental image as said combined image forming data.

17. A double-eye image pickup apparatus according to claim 12, wherein said combined image is a highly minute image comprising said image signals combined together, and said image processing means, with regard to at least some of said pairs of corresponding points which require a correction of distortion before the extraction of the corresponding points, uses the corresponding point in said base image as said combined image forming data, and does not use the corresponding point in said supplemental image as said combined image forming data.

18. A double-eye image pickup apparatus according to claim 11, wherein said combined image is a highly minute image comprising said image signals combined together, and said image processing means, with regard to at least some of said pairs of corresponding points in which a degree of blur of image foreseen from a distance from an in-focus object plane of each of said image pickup elements and a numerical aperture of each of said imaging optical systems exceeds a predetermined threshold value, uses the corresponding point in said base image as said combined image forming data, and does not use the corresponding point in said supplemental image as said combined image forming data.

19. A double-eye image pickup apparatus according to claim 12, wherein said combined image is a highly minute image comprising said image signals combined together, and said image processing means, with regard to at least some of said sampled pairs of corresponding points in which a degree of blur of image foreseen from a distance from an in-focus object plane of each of said image taking systems and a numerical aperture of each of said imaging optical systems exceeds a predetermined threshold value, uses the corresponding point in said base image as said combined image forming data, and does not use the corresponding point in said supplemental image as said combined image forming data.

20. A double-eye image pickup apparatus according to claim 11, wherein said combined image is a highly minute image comprising said image signals combined together, and said image processing means, with regard to at least some of said sampled pairs of corresponding points which appear at a predetermined spacial frequency or higher alternately with a pixel point in which corresponding points forming a pair are not found and an area in which the corresponding points forming said pair are not found, uses the corresponding point in said reference image as said combined image forming data, and does not use the corresponding points in said supplemental image as said combined image forming data.

21. An double-eye image pickup apparatus according to claim 12, wherein said combined image is a highly minute image comprising said image signals combined together, and said image processing means, with regard to at least some of said sampled pairs of corresponding points which appear at a predetermined spatial frequency or higher alternately with a pixel point in which corresponding points forming a pair are not found and an area in which the corresponding a points forming said pair are not found, uses the corresponding point in said base image as said combined image forming data, and does not use the corresponding points in said supplemental image as said combined image forming data.

* * * * *

UNITED STATES PATENT AND TRADEMARK OFFICE
CERTIFICATE OF CORRECTION

PATENT NO. : 5,602,584
DATED : February 11, 1997
INVENTOR(S) : Mitsutake et al.

It is certified that error appears in the above-indentified patent and that said Letters Patent is hereby corrected as shown below:

Column 8, line 56, change "i$^s$" to --is--.

Column 11, line 47, after "the area" insert --$\alpha$--.

Column 14, line 12, change "and-smooth" to --and smooth--.

Column 15, line 3, change "image s" to --images"--.

Column 21, line 7, change "form" to --from--.

Column 23, line 20, change "heighth" to --eight--.

Signed and Sealed this

Twelfth Day of August, 1997

Attest:

*Attesting Officer*

BRUCE LEHMAN

*Commissioner of Patents and Trademarks*